United States Patent [19]
Dornbush et al.

[11] Patent Number: 5,466,912
[45] Date of Patent: Nov. 14, 1995

[54] CONVECTION OVEN

[75] Inventors: David A. Dornbush, Prior Lake; Chad S. Erickson, Plymouth; Troy M. Iverson, Chaska; Jeffrey E. Sandahl, Burnsville; Kevin B. Moore, Chaska; Neal P. Barnes, Maple Grove; James B. Easley; Richard C. Jackson, both of Minneapolis; Andrew L. Von Duyke, Greenwood, all of Minn.

[73] Assignee: American Harvest, Inc., Chaska, Minn.

[21] Appl. No.: 337,692

[22] Filed: Jul. 27, 1993

Related U.S. Application Data

[63] Continuation-in-part of Ser. No. 50,918, Apr. 27, 1993, abandoned, which is a continuation-in-part of Ser. No. 42,839, Apr. 13, 1993, abandoned.

[51] Int. Cl.$^6$ .................................................... F27D 7/04
[52] U.S. Cl. .................... 219/400; 219/402; 219/432; 126/21 A
[58] Field of Search .................................. 219/400, 402, 219/403, 404, 432; 126/21 A, 21 R; 49/474, 476

[56]         References Cited

U.S. PATENT DOCUMENTS

| | | |
|---|---|---|
| 1,986,088 | 1/1935 | Wild . |
| 2,408,331 | 9/1946 | Mills . |
| 2,523,796 | 9/1950 | Weeks . |
| 2,708,709 | 7/1955 | Ronsch . |
| 2,898,437 | 8/1959 | McFarland . |

(List continued on next page.)

FOREIGN PATENT DOCUMENTS

| | | |
|---|---|---|
| 934357 | 1/1948 | France . |
| 7715053 | 12/1978 | France . |
| 2409736 | 6/1979 | France . |
| 2412835 | 9/1975 | Germany . |
| 7442343 | 7/1976 | Germany . |
| 2632000 | 3/1978 | Germany . |
| 57-41529 | 3/1982 | Japan . |

(List continued on next page.)

OTHER PUBLICATIONS

"New Oven is RAIR Combination of Convectin/Microwave" Section B, *Sailor Newspaper*, Monday, Oct. 3, 1983, p. 1.
RAIR Brochure, 1983.
"The Farberware Convection Turbo-Oven" Brochure Feb. 6, 1984.
Montgomery Ward catalog pages.
The DOME "Convection Cooking System" Brochure.
Cyclon Turbo Multi Cooker Brochure.

*Primary Examiner*—Philip H. Leung
*Attorney, Agent, or Firm*—Merchant, Gould, Smith, Edell, Welter & Schmidt

[57]         ABSTRACT

A convection oven includes a frame having a base member and two upright members which extend upwardly from the base member. A cooking chamber is removably supported by the frame and includes an upper enclosure member and a lower enclosure member. A housing attached to the upper enclosure member is configured so that cool air flows from a peripheral portion of an arm into a central portion of the housing and then is expelled from the arm over the upper surface of the upper enclosure member. A passive hinge connects the housing to the frame such that the housing and upper enclosure member may be both separated from the frame and lower enclosure member by lifting the housing vertically and pivoted relative to the frame and lower enclosure member. An extension ring selectively enlarges the size of the cooking chamber. A holster may hold the upper enclosure member and the housing when they are separated from the lower enclosure member. In one embodiment, an axial-type hot-air fan guides the hot air in a substantially axial direction within the cooking chamber, and a fan shroud surrounds the hot-air fan so that a radial component of the hot air is initially routed in a substantially axial direction off of the hot-air fan into the cooking chamber of the oven.

91 Claims, 13 Drawing Sheets

U.S. PATENT DOCUMENTS

| | | | |
|---|---|---|---|
| 2,949,524 | 8/1960 | Scarioni . | |
| 2,957,067 | 10/1960 | Scofield . | |
| 3,074,179 | 1/1963 | Stelling, Jr. . | |
| 3,077,530 | 2/1963 | Chase et al. . | |
| 3,168,642 | 2/1965 | Savio . | |
| 3,239,651 | 3/1966 | Silberman . | |
| 3,266,559 | 8/1966 | Osborne et al. . | |
| 3,414,708 | 12/1968 | Maier . | |
| 3,514,576 | 5/1970 | Hilton et al. . | |
| 3,529,556 | 9/1970 | Barnes . | |
| 3,529,582 | 9/1970 | Hurko . | |
| 3,586,516 | 6/1971 | Terd . | |
| 3,692,968 | 9/1972 | Yasouka . | |
| 3,759,241 | 9/1973 | Berkhoudt | 126/21 A |
| 3,770,408 | 11/1973 | McCully . | |
| 3,817,346 | 6/1974 | Wehmeyer . | |
| 3,820,524 | 6/1974 | Buckell . | |
| 3,821,454 | 6/1974 | Lobel . | |
| 3,828,760 | 8/1974 | Farber et al. . | |
| 3,883,671 | 5/1975 | Shatila . | |
| 3,884,213 | 5/1975 | Smith . | |
| 3,926,106 | 12/1975 | Deusing et al. . | |
| 3,962,962 | 6/1976 | Anderson . | |
| 3,978,843 | 9/1976 | Durth . | |
| 4,010,341 | 3/1977 | Ishammar . | |
| 4,010,349 | 3/1977 | Lee . | |
| 4,039,776 | 8/1977 | Roderick . | |
| 4,051,347 | 9/1977 | Röhrl et al. . | |
| 4,071,738 | 1/1978 | Jenn et al. . | |
| 4,071,739 | 1/1978 | Jenn et al. . | |
| 4,092,390 | 5/1978 | Mulvany, Jr. . | |
| 4,112,916 | 9/1978 | Gilbert . | |
| 4,132,216 | 1/1979 | Guiebert . | |
| 4,133,336 | 1/1979 | Smith . | |
| 4,154,861 | 5/1979 | Smith . | |
| 4,173,215 | 11/1979 | Burean et al. . | |
| 4,208,572 | 6/1980 | Melgaard . | |
| 4,210,072 | 7/1980 | Pedrimi . | |
| 4,226,178 | 10/1980 | Geissler et al. . | |
| 4,286,456 | 9/1981 | Sisti et al. . | |
| 4,295,034 | 10/1981 | Assmann . | |
| 4,327,279 | 4/1982 | Guibert . | |
| 4,350,874 | 9/1982 | Nishikawa . | |
| 4,374,318 | 2/1983 | Gilliom . | |
| 4,374,319 | 2/1983 | Guibert . | |
| 4,375,184 | 3/1983 | Gilliom . | |
| 4,420,679 | 12/1983 | Howe . | |
| 4,426,923 | 1/1984 | Ohata . | |
| 4,439,459 | 3/1984 | Swartley . | |
| 4,455,924 | 6/1984 | Wenzel . | |
| 4,460,822 | 7/1984 | Alden et al. . | |
| 4,467,777 | 8/1984 | Weber . | |
| 4,471,000 | 9/1984 | Brown et al. . | |
| 4,477,706 | 10/1984 | Mittelsteadt . | |
| 4,481,396 | 11/1984 | Matsubayashi et al. . | |
| 4,484,063 | 11/1984 | Whittenburg et al. . | |
| 4,484,064 | 11/1984 | Murray . | |
| 4,491,065 | 1/1985 | Poulson . | |
| 4,503,760 | 3/1985 | Pryputsch et al. . | |
| 4,506,598 | 3/1985 | Meister . | |
| 4,509,412 | 4/1985 | Whittenburg et al. . | |
| 4,516,012 | 5/1985 | Smith et al. . | |
| 4,561,348 | 12/1985 | Halters et al. . | |
| 4,591,698 | 5/1986 | Chang . | |
| 4,749,581 | 6/1988 | Gorsuch et al. . | |
| 4,757,800 | 7/1988 | Shei et al. . | |
| 4,781,169 | 11/1988 | Henke et al. . | |
| 4,817,509 | 4/1989 | Erickson . | |
| 4,818,550 | 4/1989 | Davidson . | |
| 5,165,138 | 11/1992 | Erickson et al. . | |
| 5,165,328 | 11/1992 | Erickson | 219/400 |
| 5,205,274 | 4/1993 | Smith | 126/21 A |
| 5,245,159 | 9/1993 | Chang . | |

FOREIGN PATENT DOCUMENTS

| | | |
|---|---|---|
| 57-174624 | 10/1982 | Japan . |
| 90-11260 | 12/1990 | Rep. of Korea . |
| 643129 | 5/1984 | Switzerland . |
| 23335 | 1/1990 | Taiwan . |
| 1429482 | 3/1976 | United Kingdom . |
| 2007515 | 5/1979 | United Kingdom . |

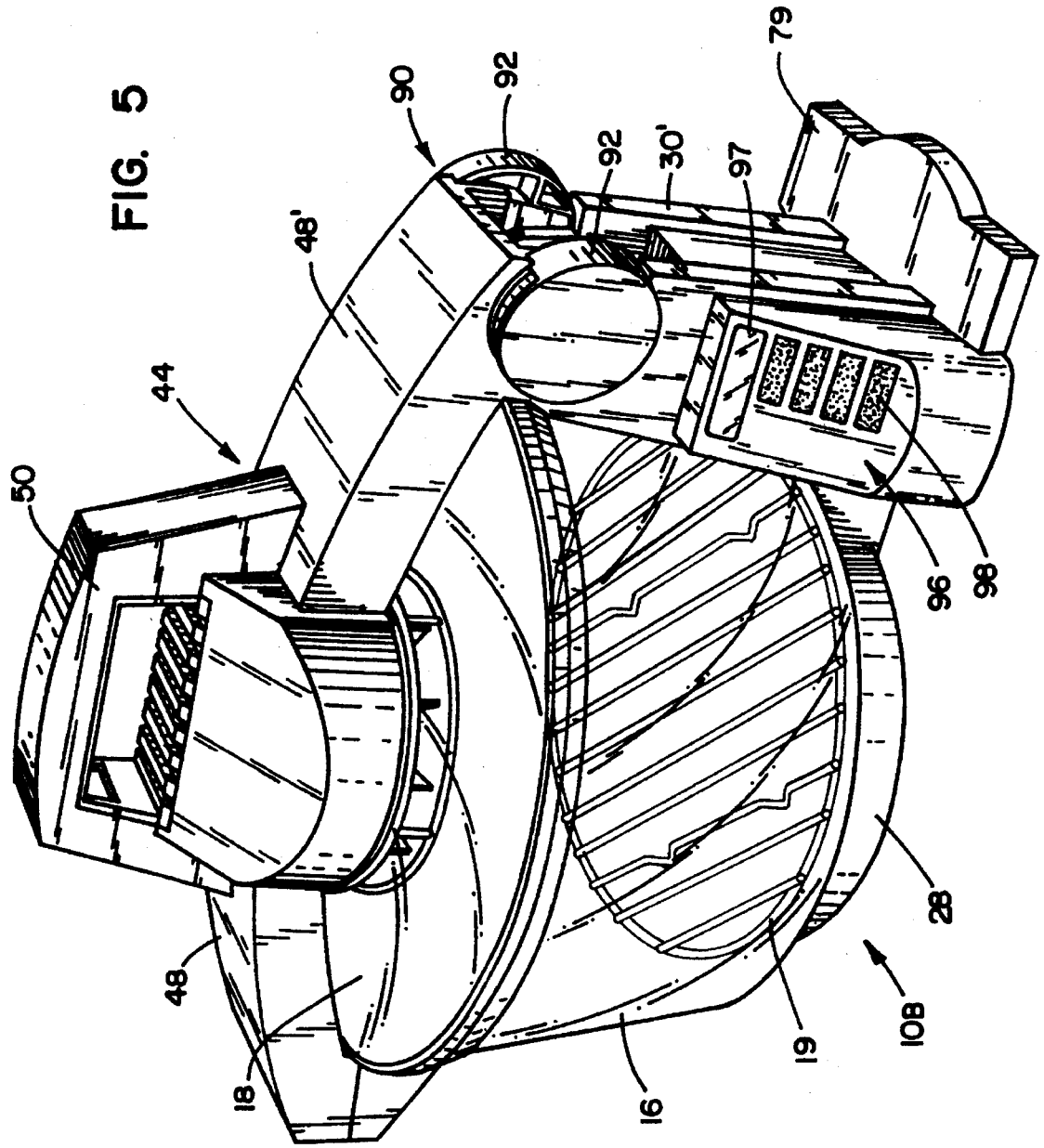

CONVECTION OVEN

This application is a continuation-in-part of U.S. Ser. No. 08/050,918, filed Apr. 27, 1993, which is a continuation-in-part of U.S. Ser. No. 08/042,839, filed Apr. 13, 1993 both now abandoned.

SUMMARY AND BACKGROUND OF THE INVENTION

The present invention relates to a convection oven for cooking of food products.

One embodiment of the invention includes a convection oven having a cooking chamber for holding the food to be cooked. The cooking chamber has an upper enclosure member and a lower enclosure member. A housing is attached to the upper enclosure member. The housing has a central portion and at least one arm extending outwardly from the central portion to beyond the outer edge of the upper enclosure member. Attached to the housing is a heater for heating air within the cooking chamber and an air-moving means for moving air within the cooking chamber. The housing is configured so that cool air flows from a peripheral portion of the arm into the central portion of the housing and then is expelled from the arm over the upper surface of the upper enclosure member.

An alternative embodiment of the invention includes a convection oven designed to rest on a supporting surface such as a countertop. The oven has a frame including a base member which rests on the supporting surface and at least two upright members which extend upwardly from the base member. A cooking chamber for holding food to be cooked is removably supported by the frame and includes an upper enclosure member and a lower enclosure member. A housing is attached to the upper enclosure member. Attached to the housing is a heater for heating air within the cooking chamber and an air-moving means for moving air within the cooking chamber.

A further embodiment of the invention includes a convection oven having a frame and designed to rest on a supporting surface such as a countertop. The oven has a cooking chamber for holding food to be cooked which includes a lower enclosure member for holding the food, and an upper enclosure member for covering the upper enclosure member. A housing is attached to the upper enclosure member. The holster attaches to the frame of the oven and is configured to hold the upper enclosure and housing when they are separated from the lower enclosure member.

One embodiment of the present invention may also include a holster for use in a convection oven having a frame and which is designed to rest on a supporting surface. The oven further includes a cooking chamber which includes a lower enclosure member for holding the food and an upper enclosure member for covering the lower enclosure member. A housing is attached to the upper enclosure member. The holster is attached to the frame of the oven and is configured to hold the housing and the upper enclosure member when they are separated from the lower enclosure member.

Another alternative embodiment of the present invention includes a convection oven having a cooking chamber for holding food to be cooked, and a frame for removably holding the cooking chamber. The frame has a base member which rests on the supporting surface and an upright member extending upwardly from the base member. The cooking chamber has an upper enclosure member and a lower enclosure member. A housing is attached to the upper enclosure member. The housing has a central portion and an arm extending outwardly from the central portion. Attached to the housing is a heater for heating air within the cooking chamber and an air-moving means for moving air within the cooking chamber. A connecting means connects the housing to the frame such that the housing and upper enclosure member may be both separated from the frame and lower enclosure member by lifting the housing vertically and pivoted relative to the frame and lower enclosure member. The housing and upper enclosure member may be pivoted between a first position wherein the upper enclosure member rests on the lower enclosure member and a second position wherein the upper enclosure member is separated from the lower enclosure member.

Another alternative embodiment of the present invention includes a convection oven having a cooking chamber for holding food to be cooked. The cooking chamber includes an upper enclosure member and a lower enclosure member. The oven includes heating means for heating air within the cooking chamber and air-moving means for moving air within the cooking chamber. At least one extension ring for enlarging the size of the cooking chamber is included. The extension ring includes a ring designed to be removably placed between the upper enclosure member and the lower enclosure member so as to increase the height of the cooking chamber, as well as handle means attached to the ring which can be gripped so as to selectively place the ring in between or remove the ring from between the upper enclosure member and the lower enclosure member.

Yet another alternative embodiment of the present invention includes a convection oven having a cooking chamber for holding food to be cooked. The cooking chamber includes an upper enclosure member and a lower enclosure member. The oven includes heating means for heating air within the cooking chamber and air-moving means for moving air within the cooking chamber. At least one extension ring for enlarging the size of the cooking chamber is included. The extension ring includes a ring designed to be removably placed between the upper enclosure member and the lower enclosure member so as to increase the height of the cooking chamber. The ring is shaped so as to form a ledge for supporting a rack within the cooking chamber.

The invention also may include an extension ring for enlarging the size of the cooking chamber of an oven. The extension ring includes a ring designed to be removably placed between the upper enclosure member and the lower enclosure member so as to increase the height of the cooking chamber, and handle means attached to the ring which can be gripped so as to selectively place the ring in between or remove the ring from between the upper enclosure member and the lower enclosure member. In an alternative embodiment, the extension ring includes a ring designed to be removably placed between the upper enclosure member and the lower enclosure member, with the ring being shaped so as to form a ledge for supporting a rack within the cooking chamber.

Yet another alternative embodiment of the invention may include a convection oven having a cooking chamber for holding the food to be cooked. The cooking chamber has an upper enclosure member and a lower enclosure member. A housing having a central portion is attached to the upper enclosure member. Attached to the housing is a heater for heating air within the cooking chamber and an axial-type hot-air fan for moving air in a substantially axial direction within the cooking chamber. The oven may also include a fan shroud surrounding the hot-air fan for providing an air duct around the periphery of the hot-air fan such that the radial component of the hot air is initially routed in a substantially axial direction off of the hot-air fan into the cooking chamber.

A yet further embodiment of the invention may include a convection oven having a cooking chamber for holding the food to be cooked. The cooking chamber has an upper enclosure member and a lower enclosure member. A housing having a central portion having a cooling fan for imparting cool air therein is attached to the upper enclosure member. Attached to the housing is a heater for heating air within the cooking chamber and an air moving means for moving air within the cooking chamber. The oven also may include a thermostat adjacent to but isolated from the cool air in the central portion of the housing so that the thermostat more accurately reflects the temperature of the cooking chamber in the oven.

BRIEF DESCRIPTION OF THE DRAWINGS

FIG. 5 is a perspective view of a second preferred embodiment of a convection oven;

DETAILED DESCRIPTION OF THE PREFERRED EMBODIMENTS

Figure 1:
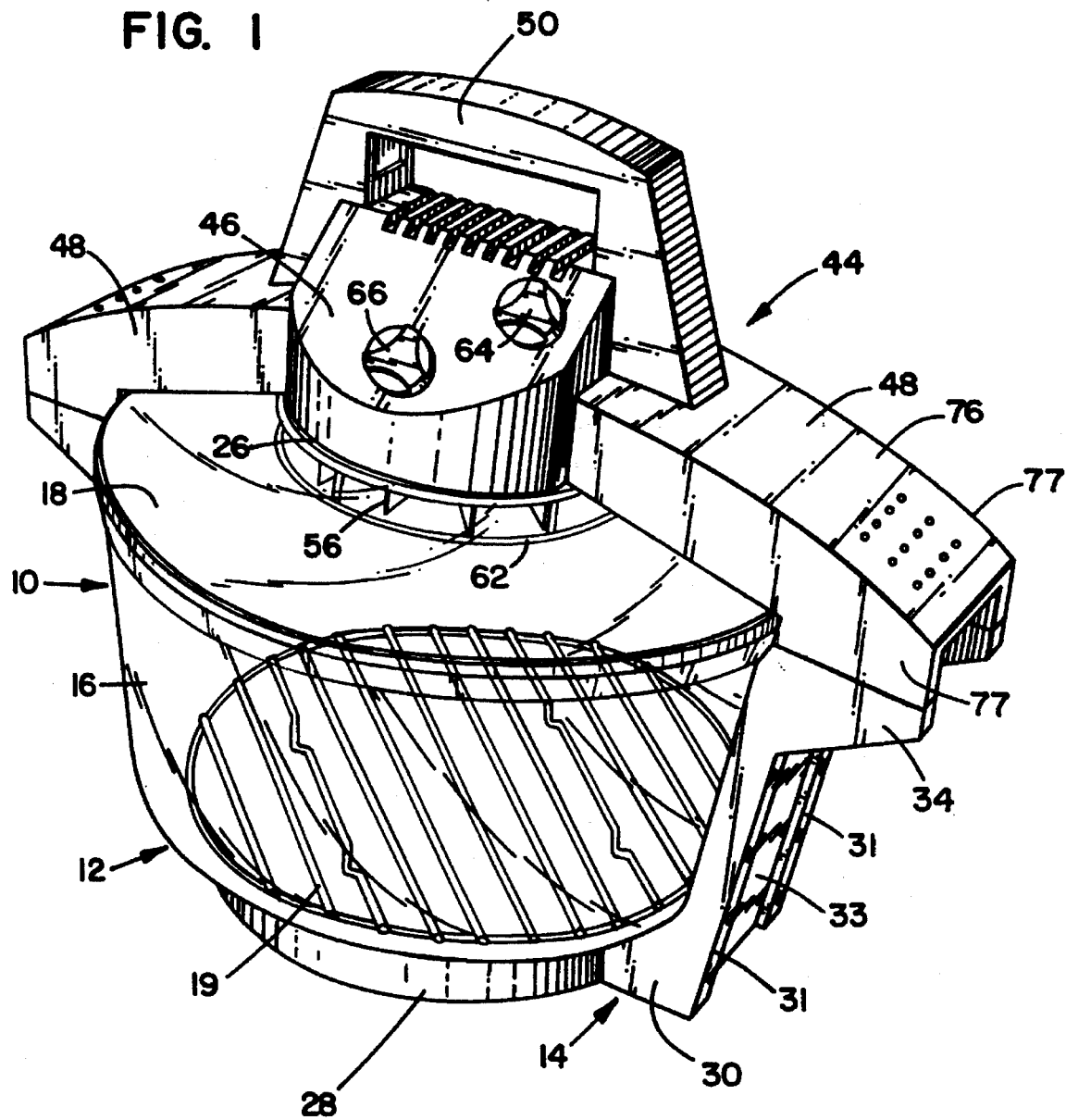
FIG. 1 is a perspective view of one preferred embodiment of a convection oven.
Figure 2:
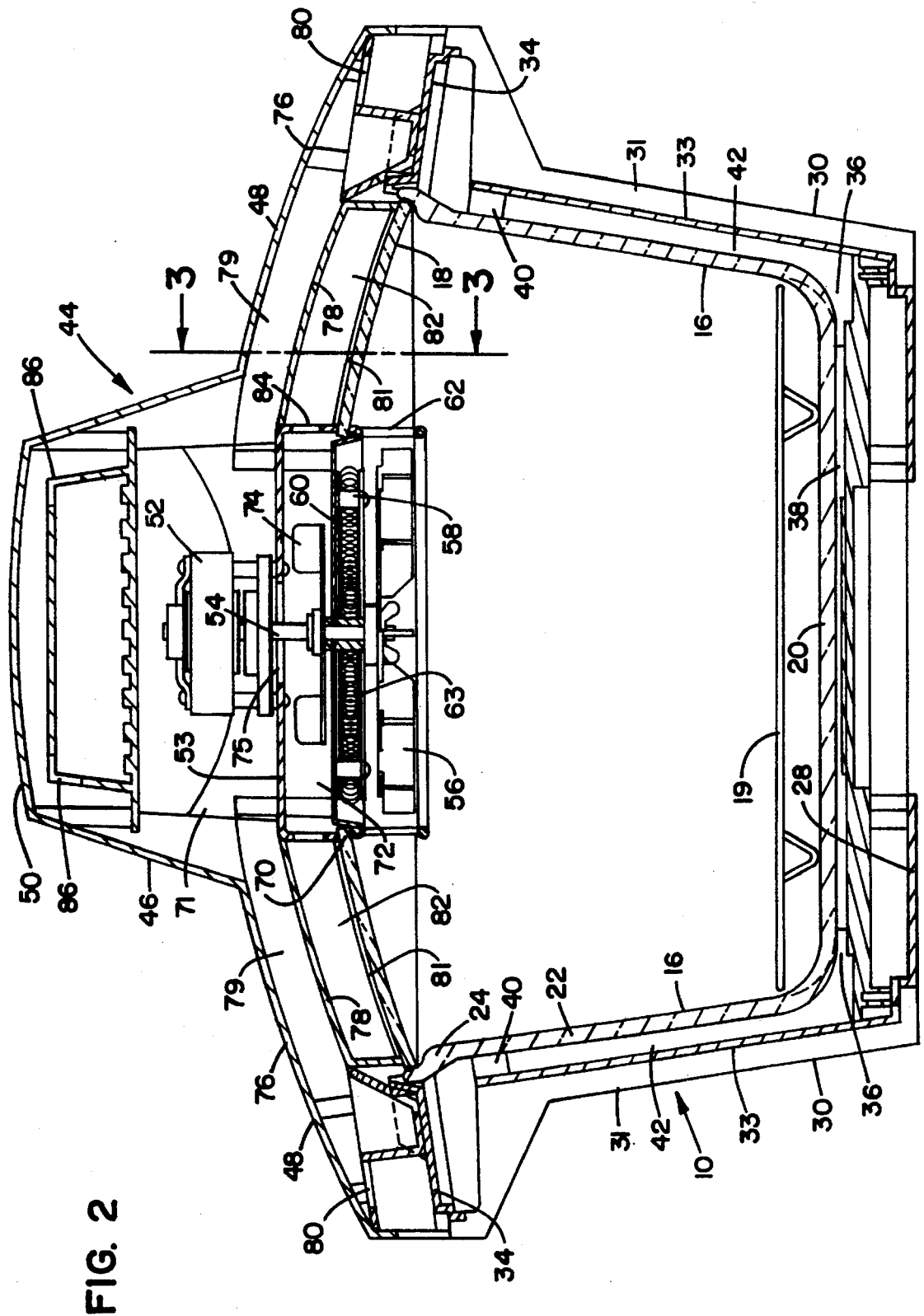
FIG. 2 is a vertical cross sectional view of the convection oven shown in FIG. 1.
Figure 3:
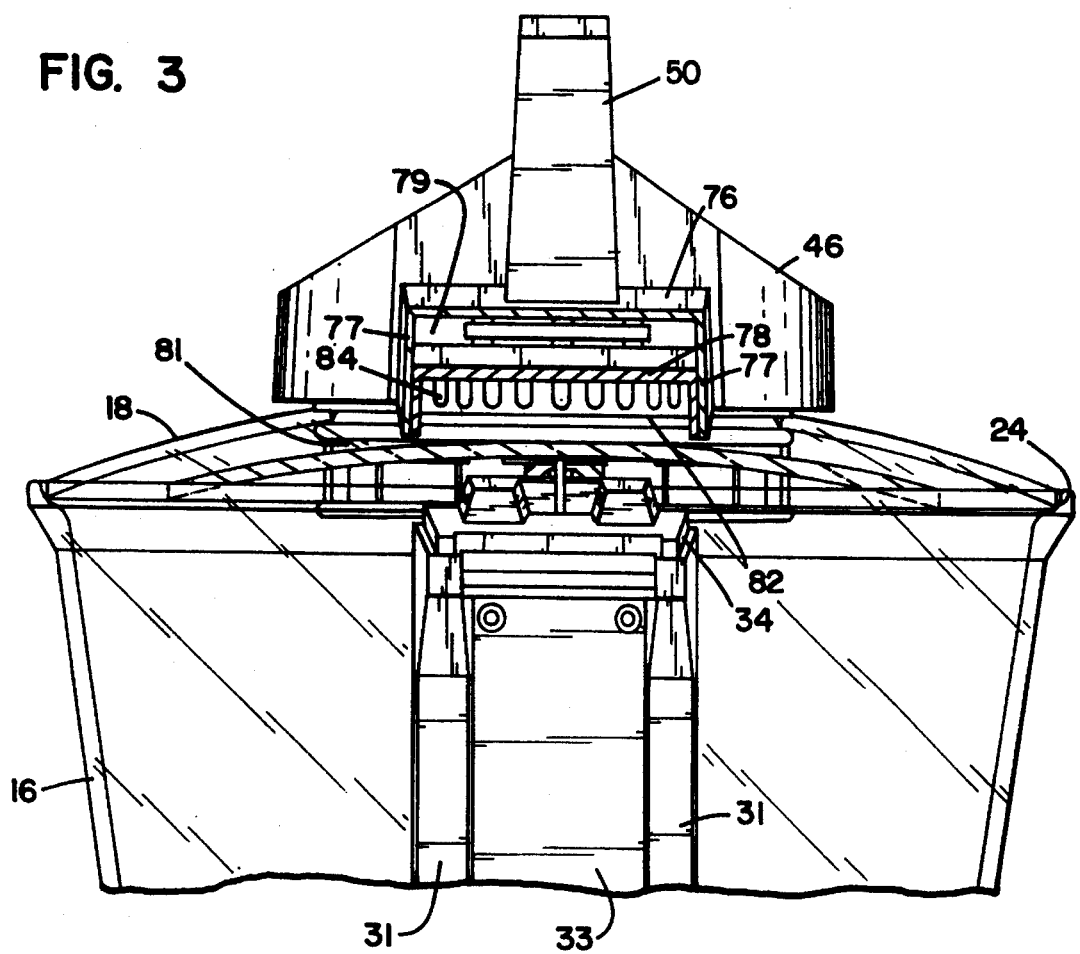
FIG. 3 is a side view of the convection oven shown in FIG. 1, with part of one arm cut away to show the interior of the housing.
Figure 4:
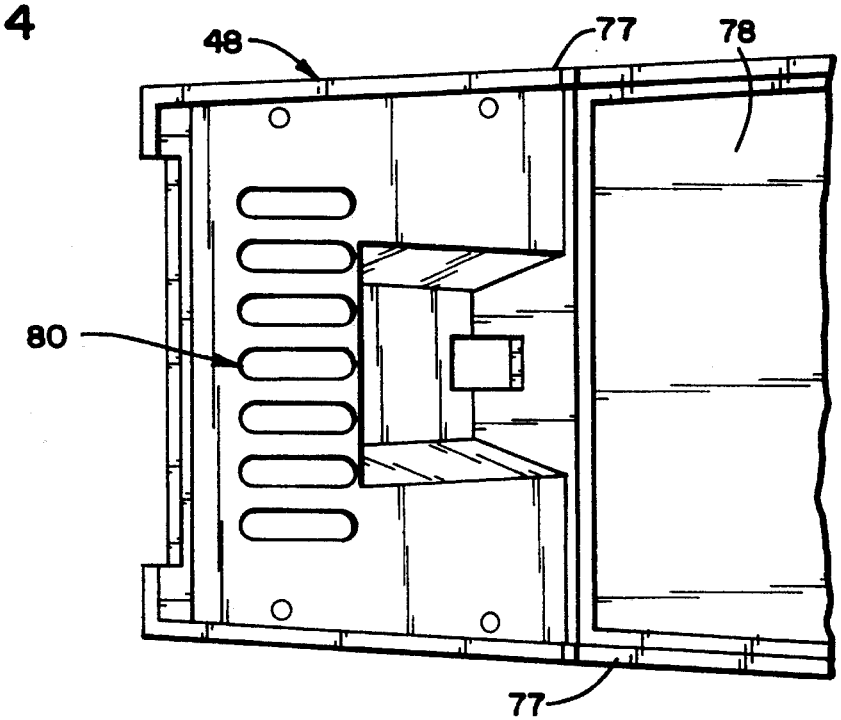
FIG. 4 is a bottom view of the end portion of an arm of the convection oven shown in FIG. 1.

One preferred embodiment of a convection oven is shown in FIGS. 1–4. With particular reference to FIGS. 1 and 2, the convection oven 10 includes a cooking chamber 12 removably supported by a frame 14.

The cooking chamber is made up of a lower enclosure member 16 and an upper enclosure member 18. The upper and lower enclosure members are preferably made out of heat resistant glass, such as PYREX. A cooking rack 19 is preferably placed within the cooking chamber to support the food to be cooked. The lower enclosure member has a bottom wall 20 and a generally-cylindrical side wall 22. A ridge 24 is formed along the upper edge of the side wall to support the upper enclosure member. The upper enclosure member has a centrally-located opening for receiving a heater and fan as will be hereinafter described.

Frame 14 is preferably made up of a base member 28 and at least two upright members 30. The base member may be generally circular in shape, and is designed to rest on the supporting surface, such as a countertop. The upright members are preferably located on diametrically opposed sides of the base member, and are made up of two riser portions 31 connected together by a connecting portion 33. The riser portions 31 extend outwardly at the upper end thereof to form supporting surfaces 34.

As seen in better detail in FIG. 2, the lower enclosure member 16 is configured to rest on the lower curved region 36 of the riser portions. Because of this arrangement, a small air space 38 is formed between the bottom wall 20 of the lower enclosure member and the base member 28. This air space helps to prevent the transfer of heat from the cooking chamber to the base member, so as to avoid excessive heating of the countertop. Alternatively, the air space may also be formed by placing a number of spacer members (not shown) between the bottom wall of the lower enclosure member and the base member.

The design of the frame provides passive cooling so as to keep the countertop cool. Specifically, air trapped in the region 42 between the connecting portion 33 of the upright members and the cooking chamber is heated by the cooking chamber. This hot air rises along the upright member. The rising air creates a suction effect, drawing cooler air into the region 42 from around the base member. This flow of air helps cool the base member and hence helps to keep the countertop cool.

A number of cushioning members 40 may be attached to the connecting portion 33 of the upright members. These cushioning members help provide support to the cooking chamber when it is held by the frame.

Frame 14 is preferably made of a thermoplastic material, such as by molding. For ease of manufacture, the upright members of the embodiment of FIG. 1 are preferably identical. As such, only two molds are required (one for the base member and one for the upright member). After molding, two of the upright members may be connected to a base member, for example using screws, to form the frame.

As best seen in FIG. 1, a housing 44 is attached to the upper enclosure member 18. Like the frame, the housing is preferably made out of a thermoplastic material. The housing is made up of a central portion 46 and two arms 48 which project outwardly from the central portion. The central portion 46 is generally circular in horizontal cross section. A handle 50 may be attached to the central portion of the housing.

The arms 48 project past the outer edge of the upper enclosure member 18. The arms are made up of a top wall 76, two side walls 77 and a middle wall 78 (see FIG. 2). The arms are configured so that the outer peripheral portion of the arms rest on the supporting surfaces 34 of the upright members. In this way, the housing 44 is supported and stabilized by the frame 14.

The arms define two air channels. The upper channel 79 is defined by the top wall 76, the two side walls 77, and the middle wall 78. An air inlet 80 (FIG. 4) located at the outer end of the arms communicates with the upper channel 79. The lower channel 82 is defined by the two side walls 77, the middle wall 78, and the upper surface of the upper enclosure member 18. A small space 81 is present between the side walls 77 and the upper surface of the upper enclosure member. This space provides for the exit of cool air for cooling the upper surface of the upper enclosure member, as will be described below.

As shown in FIG. 2, a dividing member 53 divides the interior space of the central portion 46 into an upper space 71 and a lower space 72. The dividing member has an opening 75 located in the center thereof which connects the upper space 71 and the lower space 72. A motor 52 is mounted on the dividing member 53 and is located within the upper space 71. The motor is connected by a shaft 54 to a hot-air fan 56 located within the cooking chamber. The hot-air fan 56 is preferably permanently attached to the shaft 54, such as by a hexnut.

Also located within the cooking chamber is a heater. The heater preferably may be thermostatically regulated to maintain cooking temperatures ranging from 150 to 500+degrees F. The heater generally consists of heater coils 57 and heat spacer members 58 for separating the heater coils and for providing support thereto. The heat spacer members 58 are preferably made of ceramic. A heater base 60 is also provided for isolating the heater from the lower region 72, and is preferably made of metal. The heater coils 57 are located at opposite ends of the heater base 60. The heater coils 57 and spacer members 58 are mounted to the heater base 60, such as by screws. In addition, two insulating layers 63 are provided on opposite sides of the heater coils 57, and are preferably made of Mica.

The heater coils are preferably an open coil, resistance wire type. Open heater coils are used in order to achieve the lowest possible surface watt density. With adequate air flow, such an element is capable of transferring maximum heat to the air stream via conduction, while operating in the "black" heat range. In order for other types of heating elements, such as tubular types, to give off the same wattage given the same space and airflow, the heater would glow. Such a high surface watt density would result in overheating of the motor, the food being cooked, and plastic parts through an excessive radiation of heat. In the present oven, the heater preferably operates in the "black" heat range or with only minimal glow. In addition, such an element would retain too much heat when the unit is shut off, causing additional over-temperature problems. The heater assembly also preferably incorporates an over-temperature device (not shown) capable of shutting off power to the heater should the thermostat fail.

The housing is preferably attached to the upper enclosure member by sandwiching the inner rim 70 of the upper enclosure member between the dividing member 53 and the heater base 60. A cooling fan 74 is located in the lower space 72. The cooling fan is preferably located on the same shaft as is hot-air fan 56, so that it is also rotated by motor 52.

The upper air channel 79 opens into the upper space 71. The side wall of the dividing member 53 has a plurality of openings 84 located therein so that the lower air channel 82 communicates with the lower space 72.

The above-described configuration of the housing provides for a venting system for cooling the motor 52 as well as the upper enclosure member 18. Particularly, rotation of the cooling fan 74 causes cool air to be drawn in through the air inlet 80 and into the upper channel 79 of both arms 48. From there, the cool air enters the upper space of the central portion so as to cool the motor 52. The cool air is then drawn by the cooling fan down through the opening 75 into the lower space, and then expelled into the second channel. From there, the cool air is forced out through the small space 81 between the side walls of the arm and the upper enclosure member. These jets of cool air across the surface of the upper enclosure member provide an effective method of cooling the upper enclosure member, so as to reduce the chance of accidental burning of the user. The flow of cool air also helps cool the housing itself which, being preferably made of plastic, cannot take the high temperatures produced in the heating chamber. In addition, the draw of air through the air inlet 80 also increases the flow of air up through the region 42 between the upright members 30 and the lower enclosure member, thereby increasing the cooling of the base member.

It may also be preferable to include additional air inlets 86 in the housing. These air inlets are preferably located in the underside of handle 50 so as to minimize the chance that liquid, such as water used for cleaning, will accidentally enter the housing. The air inlets provide for additional flow of cooling air over the motor 52.

The hot-air fan 56 may be a radial-type fan which, unlike conventional devices, is placed in the top center of the cooking chamber. The hot-air fan creates two air circulations. The first air circulation is throughout the cooking chamber. In particular, hot air thrown off the fan travels horizontally parallel to the upper enclosure member until it is directed downward by the corner joining the upper and lower enclosure members. The air then travels downward until it is again deflected at the bottom wall of the lower enclosure member. The air is then simultaneously pushed and drawn by the blower across the top of and beneath the cooking rack. As the air approaches the center of the enclosure, it is drawn up into the open underside of the hot-air fan where it is then recirculated through the same pattern described above.

The second air circulation passes a small portion of air over the heated coils in the heater. In other words, the small air current exits radially outwardly from the fan 56, reverses direction 180 degrees to be drawn in over the coil, then radially inwardly to the center of the heater, then downwardly into the center zone of the blade 56. This configuration provides the following advantage: most particles are unable to make the abrupt 180 degree change in direction that the air drawn through the heater does. Therefore, the air traveling through the heater assembly is virtually free of contamination, while most particles are thrown off to the sides and bottom of the cooking chamber, where they can easily be cleaned away. As a result of the above, the heater does not accumulate food, oil or grease, thereby eliminating the need to clean the heater, extending heater element life and preventing smoke or fire hazard.

A wire guard 62 may be attached to the heater base 60 for protecting the hot-air fan 56. However, the wire guard does not substantially block the air flow created by the hot-air fan, so that hot air may be circulated within the cooking chamber in a substantially unrestricted manner.

The velocity of the air is not constant within the chamber, since the heated air converges as it moves to the center of the cooking chamber and is drawn into the hot-air fan. In the convection oven, the air cools as it contacts the food, but simultaneously accelerates as it converges on the center of the chamber. This change in velocity compensates for the dropping temperature by more effectively exchanging the heat remaining in the air. The result is very uniform cooking from the outer edge to the center of the cooking rack. The velocity of the air in the oven is preferably very high, in the range of 1000–4000 linear feet per minute in the vicinity of the food, with a range of 1200–2500 being particularly preferred.

Electrical current is fed into the device 10 by way of electric cord (not shown). A thermostat 64 is provided in the central portion 46 of the housing 44 which adjusts the current supplied to the heater so as to control the temperature within the cooking chamber. The thermostat is preferably an anticipator-type self-heating thermostat, such as one manufactured by Abundance Thermo Control Factory, Type A228, thereby more readily holding the temperature of the oven in a narrow range to prevent major fluctuations in the temperature which may adversely affect the cooking of the food. A timer/switch mechanism 66 is also provided for turning the heater and motor on and for controlling the cooking time. A sensing mechanism (not shown) may be provided to provide shutdown of the unit in the case of overheating in the cooking chamber 12 and/or housing 44. A sensing mechanism (not shown) may also be included which shuts down the unit when the housing is removed from the frame with the switch 64 in the "on" position.

Figure 15:
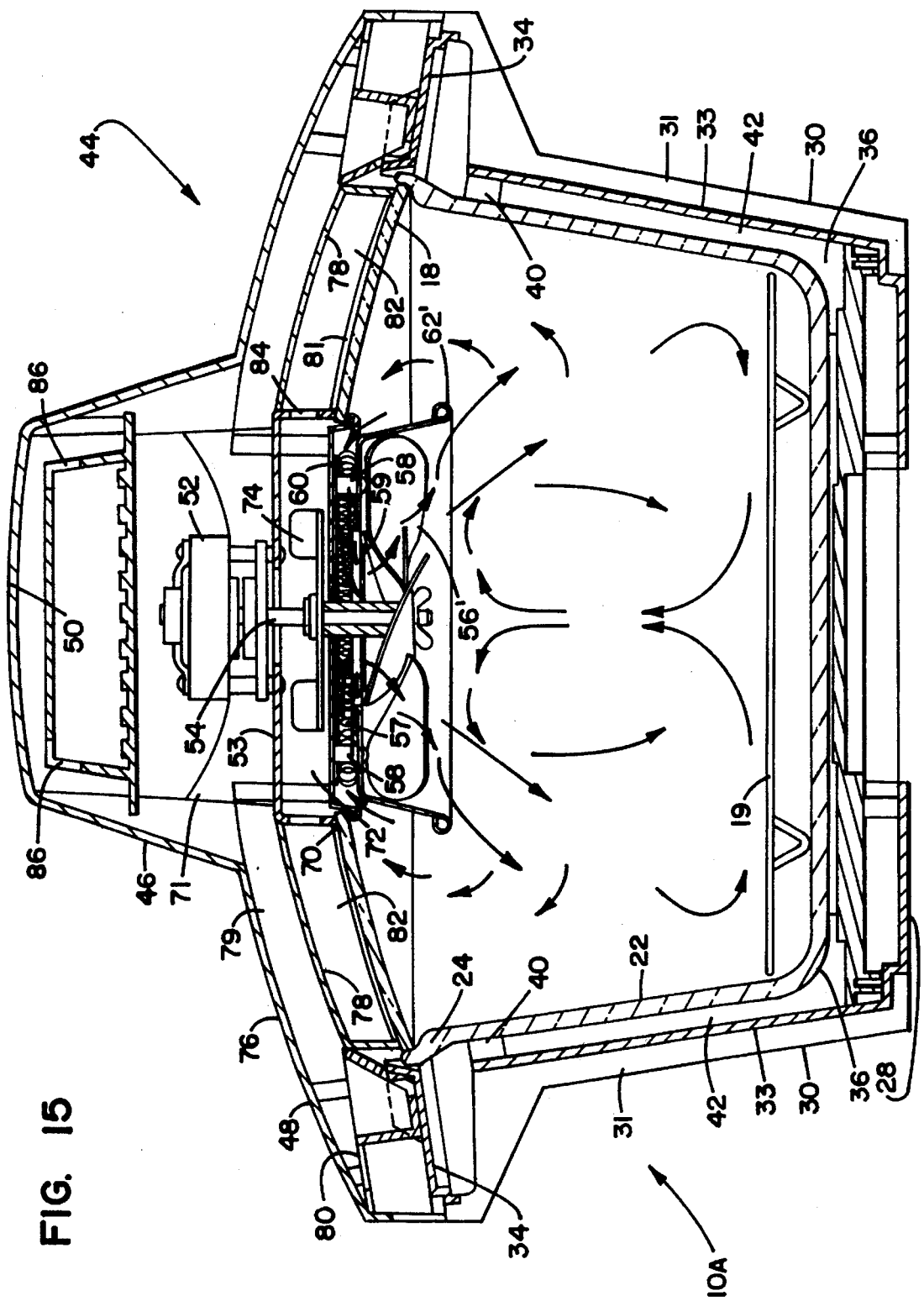
FIG. 15 is a vertical cross sectional view of the convection oven shown in FIG. 12 with a preferred embodiment of a hot-air fan design, and thermostat configuration.
Figure 16:
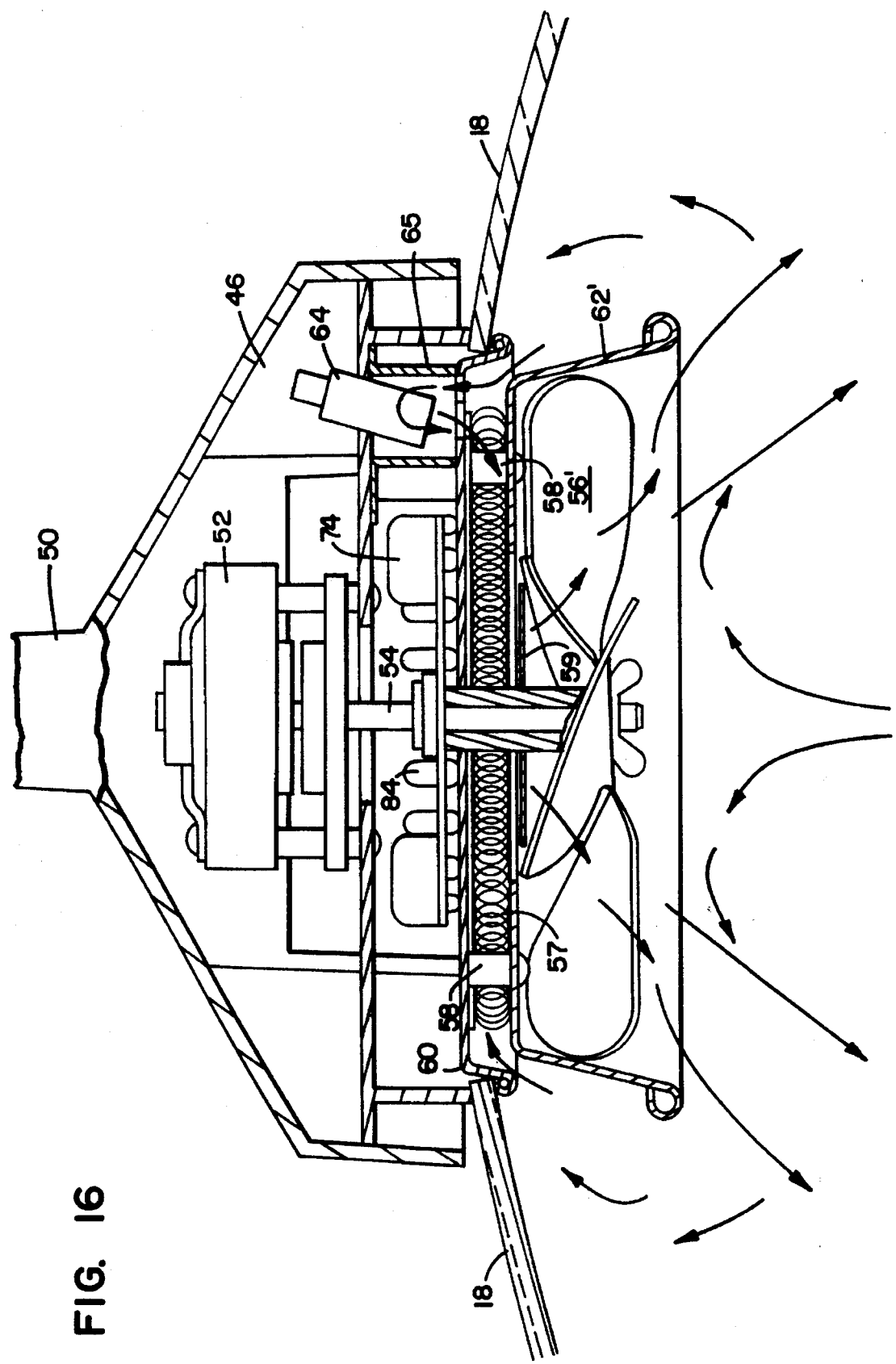
FIG. 16 is a vertical cross sectional view of the hot-air fan design and thermostat configuration of the convection oven shown in FIG. 12.

FIGS. 15 and 16 show another embodiment of a convection oven 10A. Much of the oven of FIGS. 15 and 16 are preferably identical to the embodiment of FIGS. 1 and 2, and hence will not be described again in detail. The primary changes in this embodiment are the hot-air fan design and the thermostat configuration. Unlike the radial-type hot-air fan 56 of the embodiment in FIGS. 1 and 2, hot-air fan 56' is an axial-type fan. In addition, a fan shroud 62' replaces the wire guard 62. The fan shroud 62' has an opening in the center to provide for the preferred air flow as described below. A washer 59 is also attached to the shaft 54 directly above the fan shroud 62' for providing a safety mechanism to ensure that the blades of the hot-air fan 56' are out of reach of a user's fingers. However, as with wire guard 62, neither the fan shroud 62' nor the washer 59 substantially blocks the air flow created by the hot-air fan, so that the hot air may be circulated within the cooking chamber in a substantially unrestricted manner.

Like hot-air fan 56, hot-air fan 56' also imparts a radial component of velocity on the air. However, fan shroud 62' provides a substantially vertical air duct around the periphery of the hot-air fan 56' to minimize this effect. As a result, less heat is lost to the side walls of the lower enclosure member, and more hot air is initially directed at the food itself.

More importantly, hot-air fan 56' also on its own imparts an axial component of velocity on the air. Therefore, the axial fan and fan shroud configuration provides an additional advantage over the radial-type hot-air fan by directing significantly more air in a downward direction, thereby more directly heating the food as well as creating a low pressure region around the shaft 54 in the lower space 72. This in turn pulls significantly more air through the heater coils 57, and thus more efficiently removes heat from the heater coils 57. As a result, the temperature by the heater coils 57 is lower, making the heater coils last much longer.

The other primary difference between the embodiment of FIGS. 15 and 16, and the embodiment of FIGS. 1 and 2, is that the thermostat 64' is contained within a thermostat chamber 65 adjacent the cooling fan 74 and the lower space 72. The thermostat chamber 65 has an opening 61 in the bottom so that hot air from the cooking chamber may be directed therein (see FIG. 16). The thermostat chamber, however, isolates the thermostat 64' from the lower space 72 and the cooling fan 74, and thus prevents cool air from the lower space 72 from affecting thermostat 64'. This configuration allows the oven to provide a more accurate reading.

In operation, hot air from the cooking chamber is routed upward, pulled through the opening 61 of the thermostat chamber 65 up over the thermostat 64', and then out the opening 61 toward the low pressure region near the shaft 54. Due to the low pressure region created by this new fan design, air is continually routed up and over thermostat 64'. In this manner, air by the thermostat 64' is prevented from becoming stagnant. As a result, the oven is able to respond more quickly to temperature changes.

It can be appreciated that either or both of the new hot-air fan design and thermostat configuration amy be incorporated into the embodiment of the convection shown in FIGS. 1 and 2.

The convection ovens described above are used by first lifting up on the housing 44 so as to remove the upper enclosure member 18 from the lower enclosure member 16. Food pieces such as potatoes, bakery goods, pizzas and the like may be placed on the rack 19. The housing 44 is then once again placed on the frame 14, so that the upper enclosure member 18 again rests on the lower enclosure member 16. The thermostat is then activated turning the heating and the motor on. With the hot-air fan rotating, air is moved within the cooking chamber. Air is circulated over the heater coils 57, thereby providing heat to the cooking chamber 12. The temperature will typically be in the range of 150–500 degrees F.

As seen best in FIG. 2, the outer edges of the arms 48 extend below the lower surface of the upper enclosure member 18. This is a useful feature because, when the housing 44 and upper enclosure member 18 are lifted off the frame 14 and placed on the countertop, the hot upper enclosure member 18 does not come into direct contact with the countertop. Hence, the chances of burning the countertop are reduced.

FIG. 5 shows yet another embodiment of a convection oven 10B. Much of the oven of FIG. 5 is preferably identical to that of FIG. 1, and hence will not be described again in detail. It can be appreciated, however, that either or both of the hot-air fan designs and thermostat configurations previously described herein may be incorporated in this embodiment.

The primary change in this embodiment is that the convection oven has only one upright member 30 and arm 48 as described in connection with the first embodiment. The other upright member 30' and arm 48' have been modified as described below. The upright member 30' and arm 48' are connected together by a connecting mechanism 90. This connecting mechanism acts as a "passive hinge" which allows the housing and upper enclosure member to be either lifted off and removed from the frame and lower enclosure member, or simply tilted back so as provide access to the interior of the cooking chamber.

The connecting mechanism includes two hubs 92 attached to the upright member 30' and two engagement members 94 attached to the arm 48'. As seen best in FIGS. 6–8, the hubs 92 are generally circular in vertical cross-section and have an opening 93 in the upper surface thereof. Two stop surfaces 95 are preferably located within the hubs. The engagement members may be generally triangular in shape, and are designed to fit through the opening 93 and rotate snugly within the hubs 92.

Figure 7:
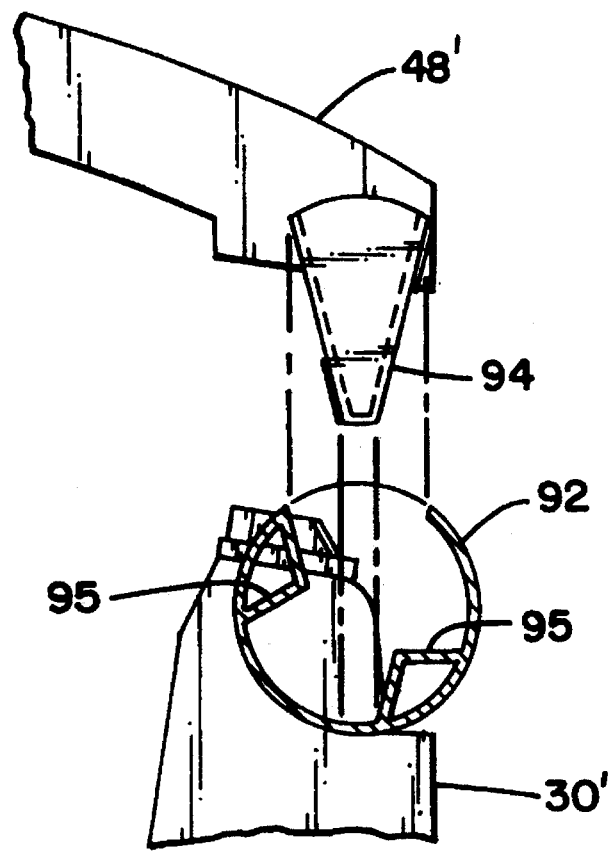
FIG. 7 is a sectional view of the hinge similar to FIG. 6, but showing the oven in the separated position.
Figure 6:
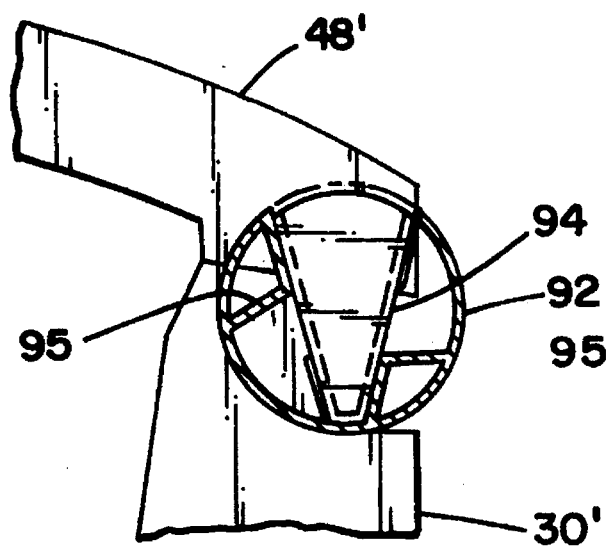
FIG. 6 is a sectional view of the hinge of the convection oven shown in FIG. 5, shown in the closed position.
Figure 8:
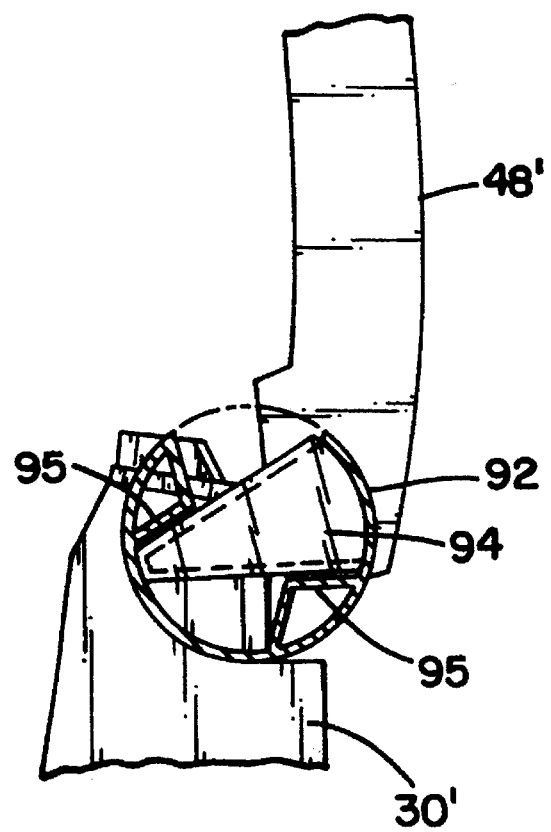
FIG. 8 is a sectional view of the hinge similar to FIG. 6, but showing the oven in the open position.

Connecting mechanism 90 is designed to allow the convection oven to function in three positions, as shown in FIGS. 6–8. The oven is shown in the closed position in FIG. 6. In this position, the engagement members 94 are located within the hubs 92. The arms 48 and 48' are resting on the upright members 30 and 30', respectively. The upper enclosure member 18 is resting on the lower enclosure member 16.

From the closed position of FIG. 6, the housing may be lifted vertically to the separated position shown in FIG. 7. The engagement members 94 pass through the openings 93 so as to disconnect the housing 44 from the frame 14. In this way, the upper enclosure member can be completely removed from the lower enclosure member, so as to provide access to the interior of the cooking chamber.

Alternatively, the housing may be rotated from the closed position of FIG. 6 to the open position of FIG. 8. In moving between the closed and open positions, the engagement members 94 rotate within the hubs 92. In the open position, the engagement members contact the stop surfaces 95, so as to prevent rotation of the housing past the open position. In this way, the upper enclosure member can simply be tipped back so as to provide access to the interior of the cooking chamber.

While in FIGS. 6–8, the engagement members 94 are attached to the arm 48' and the hubs 92 are attached to the upright member 30', this configuration can be reversed. Specifically, the engagement members may be formed on the upper portion of upright members, with the hubs mounted on the end of arm 30'. In this instance, the openings 93 are positioned in the lower surface, rather than the upper surface, of the hubs. The engagement members are still preferably triangular in shape, but would taper upwardly, instead of downwardly as shown in FIG. 6.

The hubs 92 are preferably well spaced apart on opposite sides of the upright member 30'. The upper enclosure member and motor assembly are relatively heavy, and can exert substantial sideways torque when the housing is moved to the open position. By spacing the hubs wide apart, the connecting mechanism is better able to withstand this torque created when the oven is opened.

The other primary difference between the embodiment of FIG. 5 and the embodiment of FIG. 1 is that the mechanisms for controlling the oven temperature and fan speed are located on the upright member 30'. Specifically, a control panel 96 is attached to the front of the upright member 30'. The control panel preferably has a digital display panel 97 and a plurality of buttons 98 for controlling the cooking temperature and programming cooking times.

A base extension 99 extends outwardly from the upright member 30'. The purpose of this base extension is to provide extra stability to the oven when the housing and upper enclosure member are tilted to the open position.

Figure 9:
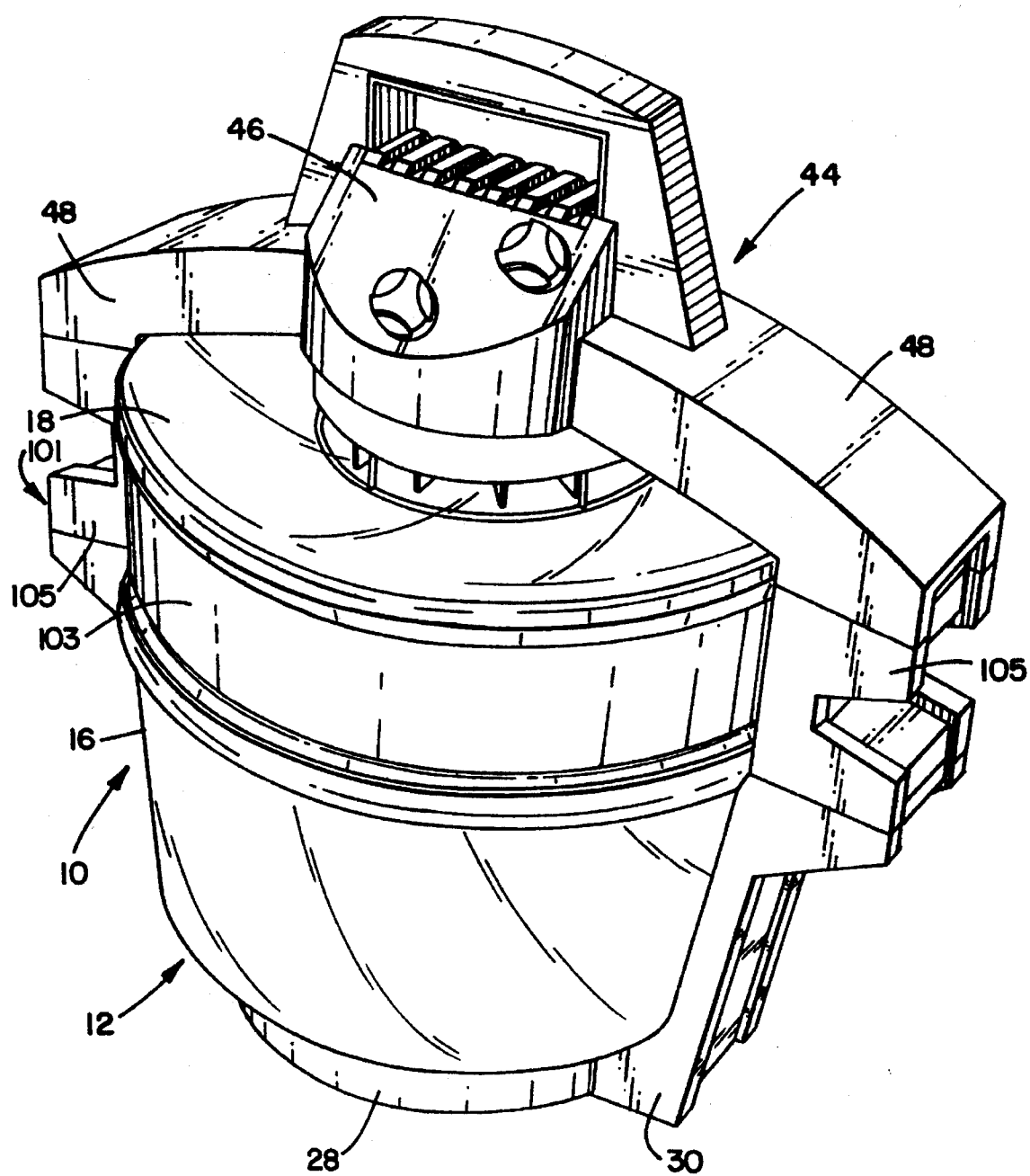
FIG. 9 is a perspective view of the oven of FIG. 1, together with a preferred embodiment of an extension ring.
Figure 10:
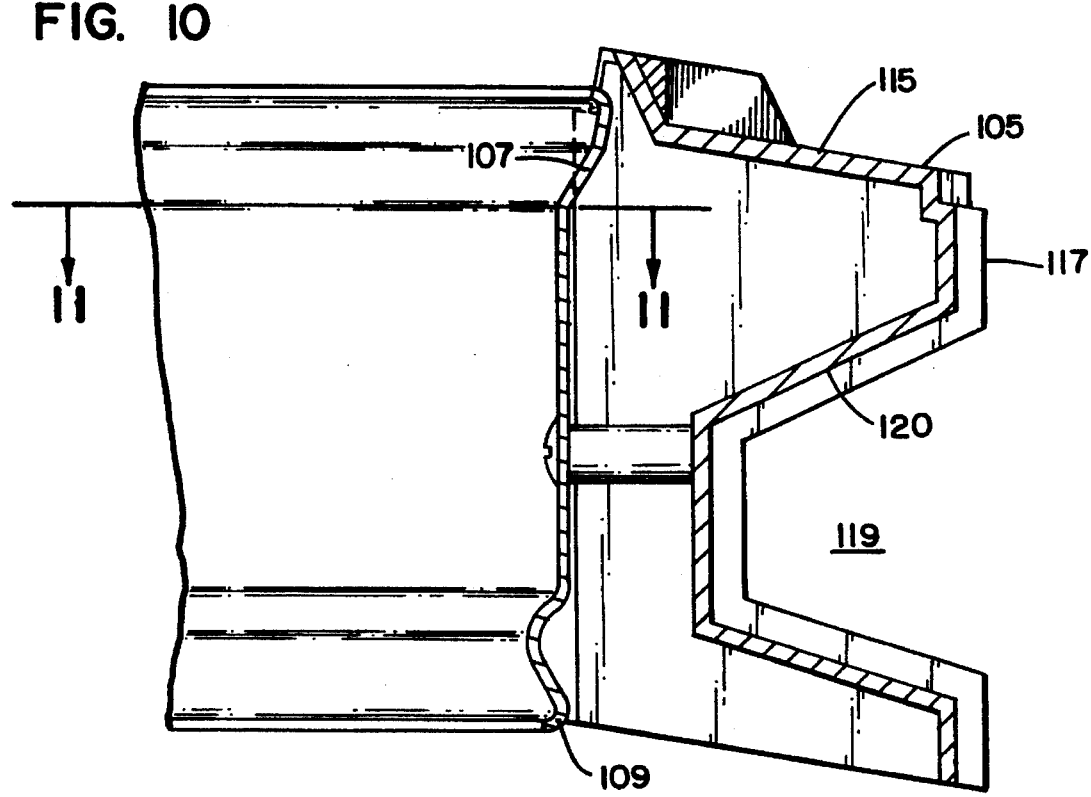
FIG. 10 is vertical cross-section of one end of the extension ring of FIG. 9.
Figure 11:
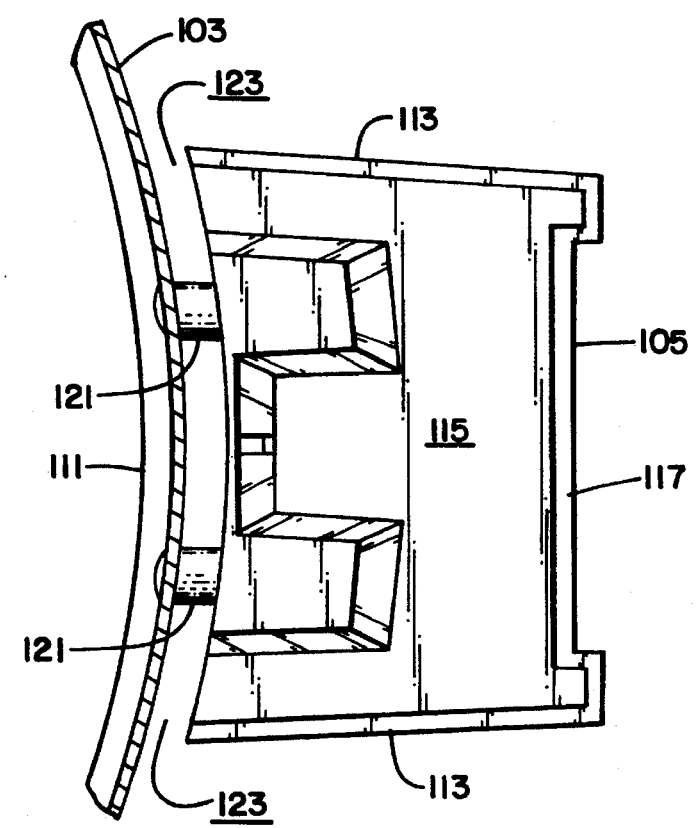
FIG. 11 is a sectional view of the extension ring of FIG. 9, taken along lines 11—11 in FIG. 10.

FIGS. 9–11 shows a preferred embodiment of an extension ring 101 used to enlarge the cooking chamber of an oven, such as that of FIG. 1. As seen in FIG. 9, the extension ring includes a ring 103 and two handles or spacers 105. The ring is designed to removably fit in between the lower enclosure member 16 and upper enclosure member 18, while the spacers fit between upright members 30 and arms 48.

Ring 103 is preferably made of metal. As better seen in FIG. 10, preferred ring 103 is not of uniform diameter. A ridge 107 may be formed at the upper edge of the ring. This ridge is similar to the ridge 24 formed at the top of the lower enclosure member, and is designed to receive the upper enclosure member. Similarly the lower edge 109 of the ring preferably is dimensioned to rest on the ridge 24. A ledge 111 may also be formed in the middle of the ring 103. This ledge is designed to support a further rack (not shown) which may be placed within the enlarged cooking chamber so as to provide an additional level for cooking. It is to be noted that an extension ring configured with a ledge or other protrusion for removably supporting a cooking rack need not employ spacers or handles 105, although such handles are preferred.

The spacers 105 are preferably made up of plastic. The spacers may include two side walls 113, a top wall 115, and a back wall 117. The top wall 115 preferably has the same general shape as the supporting surface 34 of the upright members 30, and hence is configured to support the arms 48. Likewise, the lower edge of the spacers has the same general shape as the lower end of arms 48, and hence is configured to rest on supporting surface 34.

The back wall 117 preferably has a recessed portion 119. The recessed portion defines a lifting surface 120 which provides for a convenient location to grip the extension ring when placing the extension ring on or removing the extension ring from the convection oven. In this way, the spacers 105 serve as a handle means for the ring 103. It will be recognized that many other configurations of spacers or handles 105 are possible; for example, in an oven configuration where upright members 30 and arms 48 are not employed, handles 105 could have virtually any configuration.

The spacers preferably have a plurality of bosses 121 projecting inwardly from the back wall 117. These bosses have holes in them for receiving screws or rivets used to connect the ring 103 and the spacers 105 together. The bosses 121 preferably extend slightly past the edge of side walls 113 and top wall 115 so that a small space 123 is maintained between the walls of the spacers and the ring. This space improves air circulation and helps to prevent heat damage to the plastic spacers.

Figure 12:
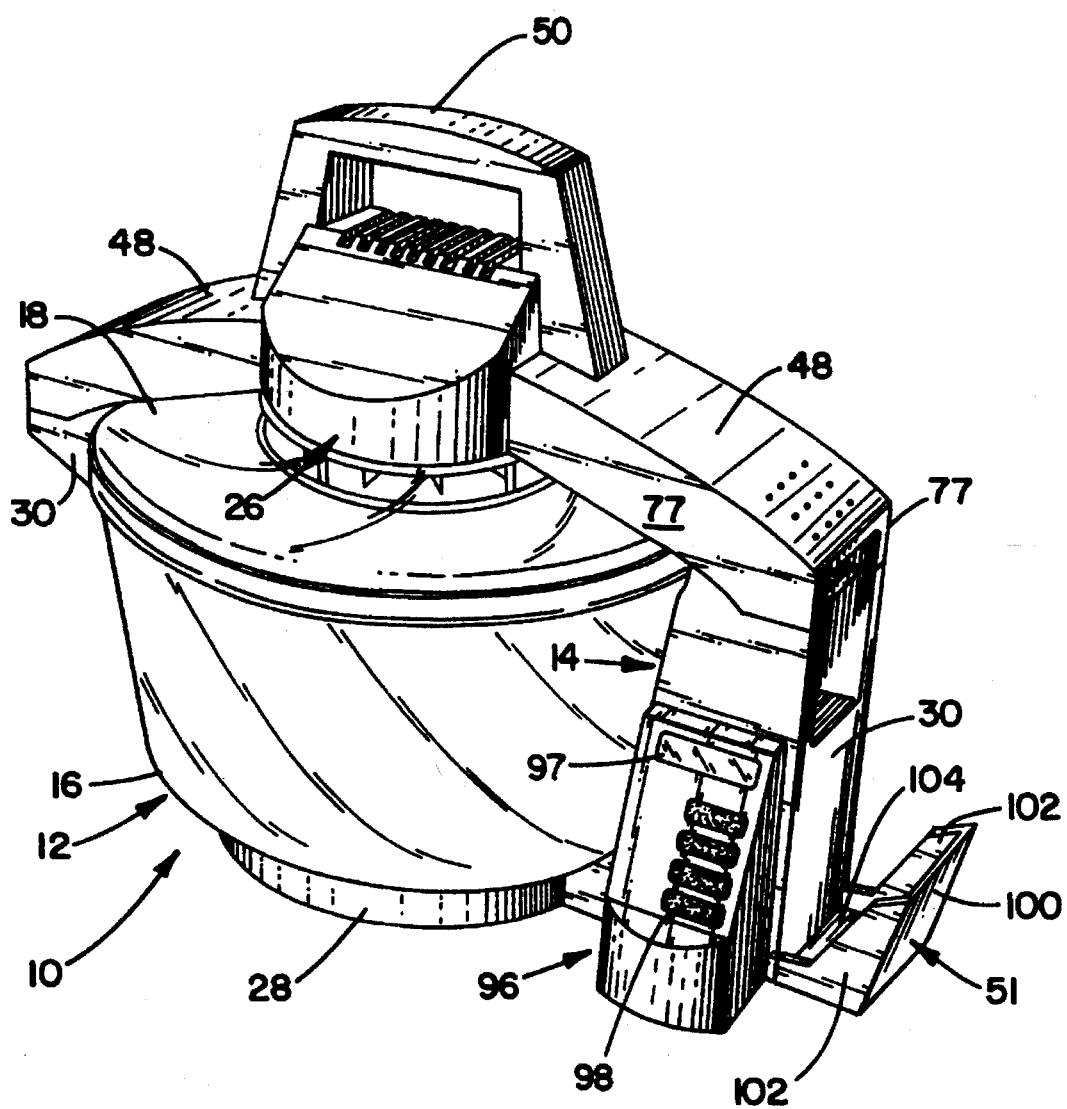
FIG. 12 is a perspective view of a third preferred embodiment of a convection oven.
Figure 13:
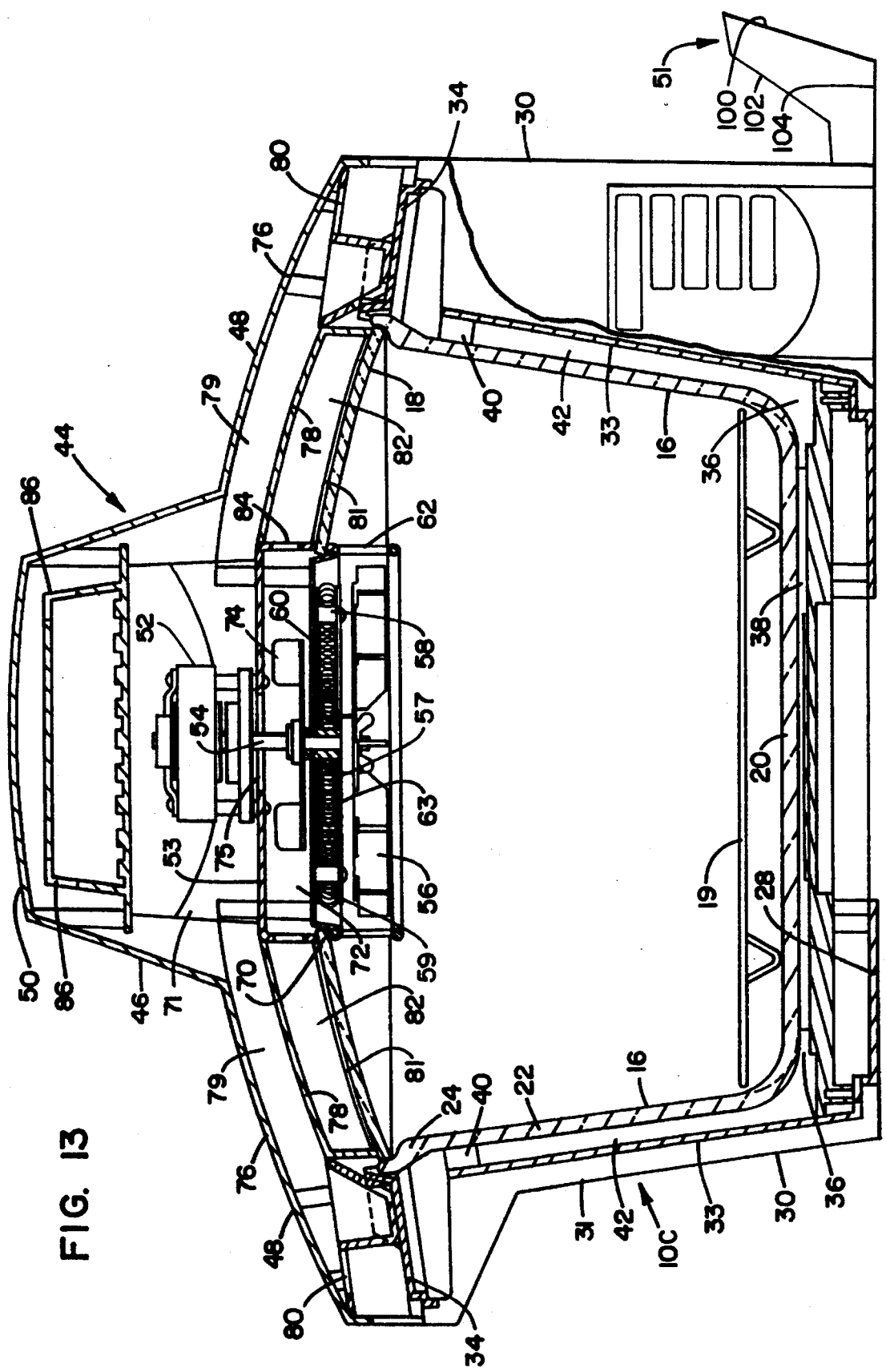
FIG. 13 is a vertical cross sectional view of the convection oven shown in FIG. 12.

FIGS. 12 and 13 show another embodiment of a convection oven 10C. Much of the oven of FIGS. 12 and 13 are preferably identical to the embodiment of FIGS. 1 and 2, and hence will not be described again in detail. Again, it can be appreciated that either or both of the hot-air fan designs and thermostat configurations previously described herein may be incorporated in this embodiment.

One primary change in this embodiment is that the mechanisms for controlling the oven temperature and hot-air fan speed are located on the upright member 30. This embodiment includes a control panel 96 like that shown in the embodiment of FIG. 5. However, unlike the embodiment shown in FIG. 5, this embodiment still includes two upright members 30 and two arms 48.

The other primary difference between the embodiment in FIGS. 12 and 13, and FIGS. 1 and 2 is that the convection oven of FIGS. 12 and 13 includes a holster 51 which may be attached to the frame 14 of the oven for holding the upper enclosure member 18 and housing 44 against the side of the oven when they are separated from the lower enclosure member 16. In this manner, the upper enclosure member 18 and the housing 44 need not take up valuable countertop space. In addition, it should be appreciated that often the upper enclosure member 18 becomes dirty during cooking. With the holster 51, the upper enclosure member 18 is kept off of the countertop, thus reducing the amount of clean up after cooking.

Figure 14B:
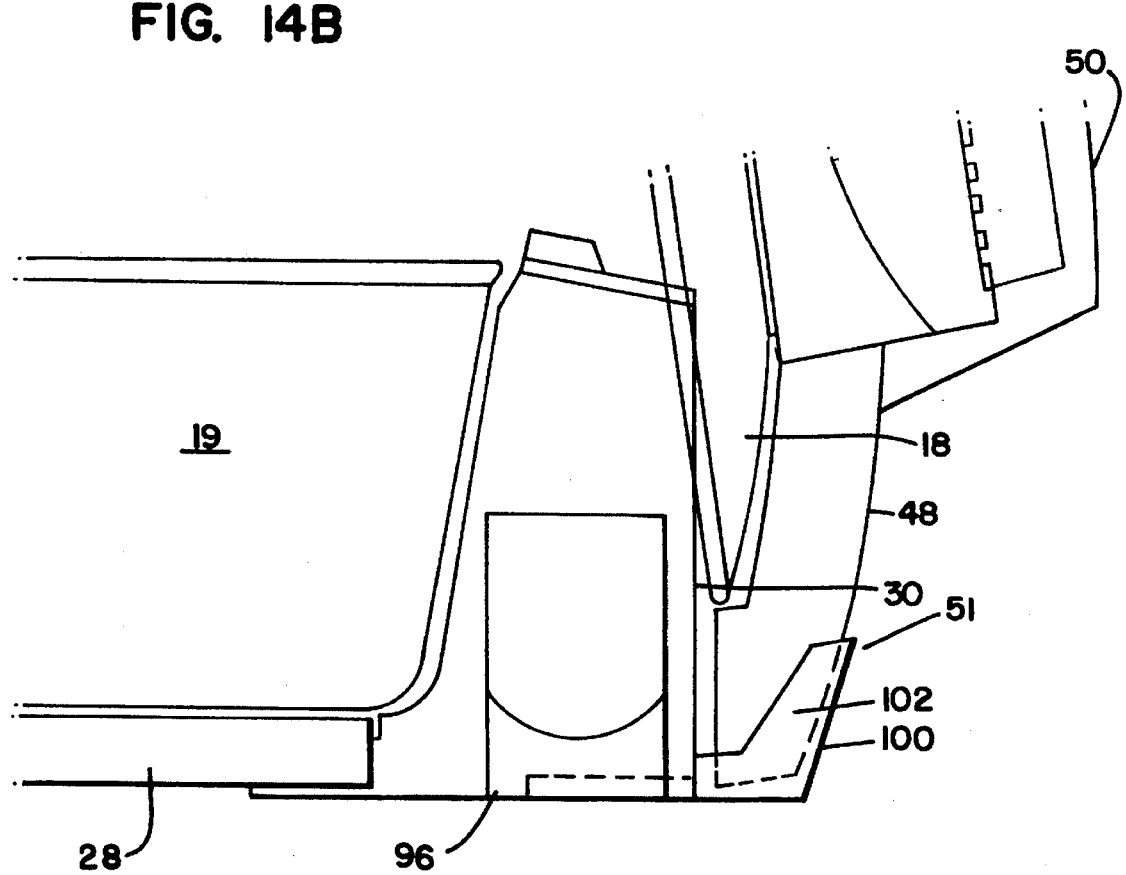
FIG. 14B is a vertical cross sectional view of the convection oven shown in FIG. 12 showing an upper enclosure member and a housing resting in the holster of FIG. 14A.
Figure 14A:
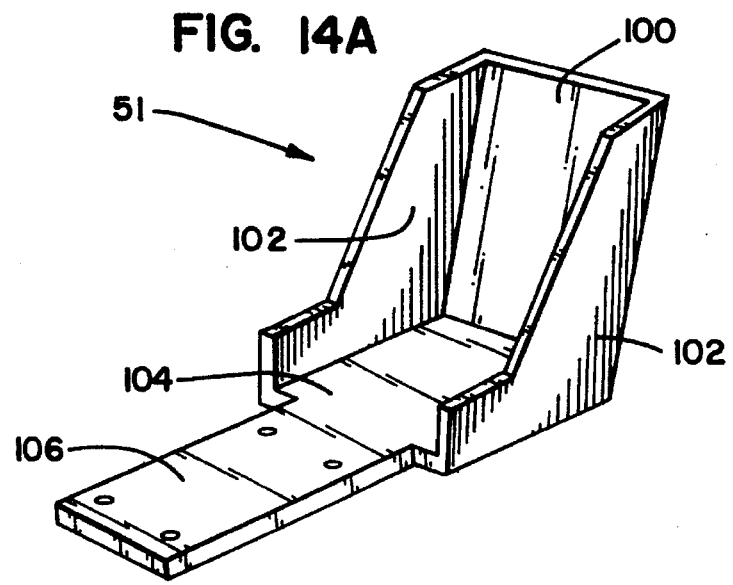
FIG. 14A is a perspective view of the holster of the convection oven shown in FIG. 12.

As can best be seen in FIG. 14A, the holster 51 has a substantially vertical wall 100 and a substantially flat, substantially horizontal base 104 attached to the substantially vertical wall 100. The substantially vertical wall 104 preferably includes two side walls 102 which define a cut-out portion for receiving the upper enclosure member 18 and housing 44 on edge. A portion 106 of the holster base 104 attaches to the frame 14 of the oven. Preferably, the portion 106 is attached to the underside of the base member 28 of the frame 14, such as by screws.

FIG. 14B shows the upper enclosure member 18 and the housing 44 in its resting position in the holster 51. Due to the low focus of weight of the holster 51, it provides support to the upper enclosure member 18 and housing 44 when they are placed therein, and ensures their stability.

The foregoing constitutes a description of various preferred embodiments. Numerous changes to the preferred embodiments are possible without departing from the spirit and scope of the invention. Hence, the scope of the invention should be determined with reference not to the preferred embodiments, but to the following claims.

What is claimed is:

1. A convection oven for cooking food, comprising:

a cooking chamber for holding the food to be cooked, the cooking chamber comprising an upper enclosure member and a lower enclosure member, the upper enclosure member having an upper surface and an outer edge;

a housing attached to the upper enclosure member, the housing comprising a central portion and at least one arm extending outwardly from the central portion to beyond the outer edge of the upper enclosure member;

heating means attached to the housing for heating air within the cooking chamber; and air-moving means attached to the housing for moving air within the cooking chamber;

wherein the housing is configured so that cool air flows from a peripheral portion of the arm into the central portion of the housing, then flows from the central portion of the housing back into the arm, and then is expelled from the arm over the upper surface of the upper enclosure member.

2. The convection oven as claimed in claim 1, further comprising a cooling fan located within central portion of the housing, wherein the cooling fan draws the cool air from the peripheral portion of the arm into the central portion and then forces the cool air from the central portion into the arm and out over the upper surface of the upper enclosure member.

3. The convection oven as claimed in claim 2, wherein the housing further comprises a handle located above the central portion, the handle defining a lower surface in which at least one intake opening is located, and wherein the cooling fan also draws in cool air from the intake opening.

4. The convection oven as claimed in claim 2, comprising two of the arms, the arms being located on diametrically opposed sides of the central portion.

5. The convection oven as claimed in claim 4, wherein the upper enclosure member has a lower rim which defines a plane, and wherein the peripheral portions of the arms extend below the plane of the lower rim.

6. The convection oven as claimed in claim 4, further comprising a frame having a base member which rests on the supporting surface and at least two upright members extending upwardly from the base member, wherein the cooking chamber is removably supported by the frame.

7. The convection oven as claimed in claim 6, wherein each of the upright members has a supporting surface located at an upper end thereof, and wherein the peripheral portion of the arms rests on the supporting surface of the upright members.

8. The convection oven as claimed in claim 6, wherein a channel is formed between upright members and the lower enclosure member and wherein heating of air in the channel causes passive air flow around the upright members and the base member.

9. The convection oven as claimed in claim 6, wherein the oven further comprises a holster attached to the frame of the oven for holding the upper enclosure member and housing when they are separated from the lower enclosure member.

10. The convection oven as claimed in claim 2, wherein the arm defines first and second channels therein, wherein the first channel carries the cool air from the peripheral portion of the arm to the central portion, and wherein the second channel carries the cool air from the central portion to the surface of the upper enclosure member.

11. The convection oven as claimed in claim 10, wherein the arm comprises a top wall, a middle wall and two side walls, wherein the first channel is defined by the top wall, the middle wall and the two side walls, and wherein the second channel is defined by the middle wall, the side walls, and the upper surface of the upper enclosure member.

12. The convection oven as claimed in claim 11, wherein a small space is defined between the side walls and the upper surface of the upper enclosure member, and wherein cool air is forced out the small space to cool the upper surface of the upper enclosure member.

13. The convection oven as claimed in claim 10, further comprising a dividing member located within the central portion of the housing, the dividing member having a central opening located therein, wherein the dividing member defines an upper space which communicates with the first channel and a lower space which communicates with the second channel.

14. The convection oven as claimed in claim 13, wherein the cooling fan is located in the lower space.

15. The convection oven as claimed in claim 13, further comprising a motor attached to the cooling fan, and wherein the motor is located in the upper space and rests on the dividing member.

16. The convection oven as claimed in claim 1, further comprising means located on the housing for adjusting the heating means and means located on the housing for adjusting the air-moving means.

17. The convection oven as claimed in claim 1, wherein the air moving means moves the air within the cooking chamber at least 1000 feet per minute in the vicinity of the food being cooked.

18. The convection oven as claimed in claim 17, wherein the air moving means moves the air within the cooking chamber at between 1200 and 2500 feet per minute in the vicinity of the food being cooked.

19. The convection oven as claimed in claim 1, wherein the air moving means comprises:

an axial-type hot-air fan moving hot air in a substantially axial direction within the cooking chamber; and a fan shroud surrounding the hot-air fan for providing an air duct around the periphery of the hot-air fan such that a radial component of the hot air is initially routed in a substantially axial direction off of the hot-air fan into the cooking chamber of the oven.

20. The convection oven as claimed in claim 1, wherein the central portion of the housing comprises a thermostat for regulating the temperature of the oven.

21. The convection oven as claimed in claim 20, wherein the thermostat is adjacent to but isolated from the cool air in the central portion of the housing so that the thermostat more accurately reflects the temperature in the cooking chamber of the oven.

22. A convection oven designed to rest on a supporting surface such as a countertop, comprising:

a frame comprising a base member which rests on the supporting surface and two upright members extending upwardly from the base member, each of the upright members having a supporting surface located at an upper end thereof;

a cooking chamber for holding food to be cooked, the cooking chamber being removably supported by the frame and comprising an upper enclosure member and a lower enclosure member, the upper enclosure member having an outer edge;

a housing attached to the upper enclosure member, the housing comprising a central portion and two arms extending outwardly from the central portion, the arms each having a peripheral portion which extends beyond the outer edge of the upper enclosure member, wherein the peripheral portion of the arms rests on the supporting surface of the upright members;

heating means attached to the housing for heating air within the cooking chamber; and air-moving means attached to the housing for moving air within the cooking chamber.

23. The convection oven as claimed in claim 22, wherein an air space is formed between the lower enclosure member and the base member.

24. The convection oven as claimed in claim 23, further comprising spacer members attached to an upper surface of the base member, wherein the lower enclosure member rests on the spacer members.

25. The convection oven as claimed in claim 23, wherein the upright members each comprise a projecting surface on which the lower enclosure member rests.

26. The convection oven as claimed in claim 22, further comprising at least one spacer member attached to each of the upright members, wherein the lower enclosure member comprises a bottom wall and a circumferential side wall, and wherein the spacer members contact the circumferential side wall of the lower enclosure member to hold the cooking chamber in place.

27. The convection oven as claimed in claim 22, wherein a channel is formed between the upright members and the lower enclosure member and wherein heating of air in the channel causes passive air flow around the upright members and the base member.

28. The convection oven as claimed in claim 27, wherein the upright members each comprise two riser portions connected together by a connecting wall, and wherein the channel is formed between the connecting wall and the lower enclosure member.

29. The convection oven as claimed in claim 22, wherein the upper enclosure member has a lower rim which defines a plane, and wherein the peripheral portions of the arms extend below the plane of the lower rim.

30. The convection oven as claimed in claim 22, wherein the upright members are located on diametrically opposed sides of the base member, and wherein the arms are located on diametrically opposed sides of the central portion.

31. The convection oven as claimed in claim 22, wherein the housing further comprises a handle located above the central portion.

32. The convection oven as claimed in claim 22, wherein the upright members are detachable from the base member.

33. The convection oven as claimed in claim 22, wherein the housing is configured so that cool air flows from the peripheral portion of the arm into the central portion of the housing and then is expelled from the arm over the upper surface of the upper enclosure member.

34. The convection oven as claimed in claim 33, wherein the central portion of the housing comprises a thermostat for regulating the temperature of the oven.

35. The convection oven as claimed in claim 34, wherein the thermostat is adjacent to but isolated from the cool air in the central portion of the housing so that the thermostat more accurately reflects the temperature of the cooking chamber in the oven.

36. The convection oven as claimed in claim 22, wherein the oven further comprises a holster attached to the frame of the oven for holding the upper enclosure member and housing when they are separated from the lower enclosure member.

37. The convection oven as claimed in claim 22, wherein the air moving means comprises:

an axial-type hot-air fan moving hot air in a substantially axial direction within the cooking chamber; and a fan shroud surrounding the hot-air fan for providing an air duct around the periphery of the hot-air fan such that a radial component of the hot air is initially routed in a substantially axial direction off of the hot-air fan into the cooking chamber.

38. A convection oven designed to rest on a supporting surface such as a countertop, comprising:

a frame comprising a base member which rests on the supporting surface and an upright member extending upwardly from the base member;

a cooking chamber for holding food to be cooked, the cooking chamber being removably supported by the frame and comprising an upper enclosure member and a lower enclosure member;

a housing attached to the upper enclosure member, the housing comprising a central portion and an arm extending outwardly from the central portion;

heating means attached to the housing for heating air within the cooking chamber;

air-moving means attached to the housing for moving air within the cooking chamber; and connecting means for connecting the housing to the frame such that the housing and upper enclosure member may be both separated from the frame and lower enclosure member by lifting the housing vertically and pivoted relative to the frame and lower enclosure member between a first position wherein the upper enclosure member rests on the lower enclosure member and a second position wherein the upper enclosure member is separated from the lower enclosure member.

39. The convection oven as claimed in claim 38, wherein the connecting means comprises at least one hub attached to the upright member and at least one engagement member attached to the arm of the housing and designed to be removably received within the hub.

40. The convection oven as claimed in claim 39, wherein the upright member and the arm of the housing each have opposing sides, and wherein the connecting means comprises two of the hubs, one attached to each side of the upright member, and two of the engagement members, one attached to each side of the arm.

41. The convection oven as claimed in claim 39, wherein the hub has an upper surface having an opening therein through which the engagement member may be moved so as to separate the housing and upper enclosure member from the frame and lower enclosure member.

42. The convection oven as claimed in claim 41, wherein the engagement member may rotate within the hub so as to rotate the upper enclosure member between the first and second positions.

43. The convection oven as claimed in claim 42, wherein the connecting means further comprises at least one stop surface located within the hub to prevent rotation of the housing and upper enclosure member past the second position.

44. The convection oven as claimed in claim 38, wherein the housing further comprises a handle located above the central portion.

45. The convection oven as claimed in claim 38, wherein the arm is a first arm and the upright portion is a first upright portion, wherein the housing further comprises a second arm and the frame further comprises a second upright member.

46. The convection oven as claimed in claim 45, wherein the first and second arms are located on diametrically opposed sides of the central portion, and wherein the first and second upright members are located on diametrically opposed sides of the base member.

47. The convection oven as claimed in claim 46, wherein the upper enclosure member has a lower rim which defines a plane, and wherein peripheral portions of the arms extend below the plane of the lower rim.

48. The convection oven as claimed in claim 45, wherein the second arm rests on the second upright member when the housing and upper enclosure member are in the first position.

49. The convection oven as claimed in claim 45, wherein the housing is configured so that cool air flows from a peripheral portion of the first and second arms into the central portion of the housing and then is expelled from the first and second arms over an upper surface of the upper enclosure member.

50. The convection oven as claimed in claim 49, wherein the first and second arms each define first and second channels therein, wherein the first channel carries the cool air from the peripheral portion of the arm to the central portion, and wherein the second channel carries the cool air from the central portion to the upper surface of the upper enclosure member.

51. The convection oven as claimed in claim 50, wherein the first and second arms each comprise a top wall, a middle wall and two side walls, wherein the first channel is defined by the top wall, the middle wall and the two side walls, and wherein the second channel is defined by the middle wall, the side walls, and the upper surface of the upper enclosure member.

52. The convection oven as claimed in claim 51, wherein a small space is defined between the side walls and the upper surface of the upper enclosure member, and wherein cool air is forced out the small space to cool the upper surface of the upper enclosure member.

53. The convection oven as claimed in claim 38, wherein the air moving means comprises:

an axial-type hot-air fan moving hot air in a substantially axial direction within the cooking chamber; and a fan shroud surrounding the hot-air fan for providing an air duct around the periphery of the hot-air fan such that a radial component of the hot air is initially routed in a substantially axial direction off of the hot-air fan into the cooking chamber.

54. The convection oven as claimed in claim 38, wherein the housing is configured so that cool air flows from the peripheral portion of the arm into the central portion of the housing and then is expelled from the arm over the upper surface of the upper enclosure member.

55. The convection oven as claimed in claim 54, wherein the central portion of the housing comprises a thermostat for regulating the temperature of the oven.

56. The convection oven as claimed in claim 55, wherein the thermostat is adjacent to but isolated from the cool air in the central portion of the housing so that the thermostat more accurately reflects the temperature of the cooking chamber in the oven.

57. A convection oven, comprising:

a cooking chamber for holding food to be cooked, the cooking chamber comprising an upper enclosure member and a lower enclosure member;

heating means for heating air within the cooking chamber;

air-moving means for moving air within the cooking chamber; and connecting means for connecting the upper enclosure member to the lower enclosure member such that the upper enclosure member may be both separated from the lower enclosure member by lifting the upper enclosure member vertically and pivoted relative to the lower enclosure member between a first position wherein the upper enclosure member rests on the lower enclosure member and a second position wherein the upper enclosure member is separated from the lower enclosure member.

58. The convection oven as claimed in claim 57, further comprising:

a frame having a base member which rests on supporting surface and an upright member extending upwardly from the base member, wherein the cooking chamber is removably supported by the frame; and a housing attached to the upper enclosure member, the housing comprising a central portion and an arm extending outwardly from the central portion;

wherein the connecting means comprises at least one hub attached to the upright member and at least one engagement member attached to the arm of the housing and designed to be removably received within the hub.

59. The convection oven as claimed in claim 58, wherein the housing is configured so that cool air flows from the peripheral portion of the arm into the central portion of the housing and then is expelled from the arm over the upper surface of the upper enclosure member.

60. The convection oven as claimed in claim 59, wherein the central portion of the housing comprises a thermostat for regulating the temperature of the oven.

61. The convection oven as claimed in claim 60, wherein the thermostat is adjacent to but isolated from the cool air in the central portion of the housing so that the thermostat more accurately reflects the temperature of the cooking chamber in the oven.

62. The convection oven as claimed in claim 57, wherein the air moving means comprises:

an axial-type hot-air fan moving hot air in a substantially axial direction within the cooking chamber; and a fan shroud surrounding the hot-air fan for providing an air duct around the periphery of the hot-air fan such that a radial component of the hot air is initially routed in a substantially axial direction off of the hot-air fan into the cooking chamber.

63. A convection oven, comprising:

a cooking chamber for holding food to be cooked, the cooking chamber comprising an upper enclosure member and a lower enclosure member;

heating means for heating air within the cooking chamber;

air-moving means for moving air within the cooking chamber; and at least one extension ring, the extension ring comprising:

a ring designed to be removably placed between the upper enclosure member and the lower enclosure member so as to increase the height of the cooking chamber; and handle means attached to the ring which can be gripped so as to selectively place the ring in between or remove the ring from between the upper enclosure member and the lower enclosure member, wherein the handle means comprises two spacers, each of the spacers having opposing side walls and a back wall.

64. The convection oven as claimed in claim 63, wherein the ring is shaped so as to form a ledge for removably supporting a rack within in the cooking chamber.

65. The convection oven as claimed in claim 63, wherein the back wall of each spacer has a recessed portion which defines a lifting surface for lifting the ring off of the lower enclosure member.

66. The convection oven as claimed in claim 63, wherein the spacers comprise a plurality of bosses used to attach the spacers to the ring, and wherein the bosses extend past an inner edge of the side walls so as to create a space between the side walls and the ring.

67. The convection oven as claimed in claim 63, wherein the air moving means comprises:

an axial-type hot-air fan moving hot air in a substantially axial direction within the cooking chamber; and a fan shroud surrounding the hot-air fan for providing an air duct around the periphery of the hot-air fan such that a radial component of the hot air is initially routed in a substantially axial direction off of the hot-air fan into the cooking chamber.

68. A convection oven, comprising:

a cooking chamber for holding food to be cooked, the cooking chamber comprising an upper enclosure member and a lower enclosure member;

heating means for heating air within the cooking chamber;

air-moving means for moving air within the cooking chamber;

a frame comprising a base member which rests on the supporting surface and at least two upright members extending upwardly from the base member;

a housing attached to the upper enclosure member, the housing comprising a central portion and two arms extending outwardly from the central portion, the arms each having a peripheral portion which extends beyond the outer edge of the upper enclosure member; and at least one extension ring, the extension ring comprising:

a ring designed to be removably placed between the upper enclosure member and the lower enclosure member so as to increase the height of the cooking chamber; and handle means attached to the ring which can be gripped so as to selectively place the ring in between or remove the ring from between the upper enclosure member and the lower enclosure member.

69. The convection oven as claimed in claim 68, wherein when the ring is removed from between the upper and lower enclosure members, the peripheral portion of the arms rests on the upright members, and wherein when the ring is placed between the upper and lower enclosure members, the spacers rest on the upright members and the peripheral portions of the arms rest on the spacers.

70. The convection oven as claimed in claim 68, wherein the oven further comprises a holster attached to the frame of the oven for holding the upper enclosure member and housing when they are separated from the lower enclosure member.

71. The convection oven as claimed in claim 68, wherein the housing is configured so that cool air flows from the peripheral portion of the arm into the central portion of the housing and then is expelled from the arm over the upper surface of the upper enclosure member.

72. The convection oven as claimed in claim 71, wherein the central portion of the housing comprises a thermostat for regulating the temperature of the oven.

73. The convection oven as claimed in claim 72, wherein the thermostat is adjacent to but isolated from the cool air in the central portion of the housing so that the thermostat more accurately reflects the temperature of the cooking chamber in the oven.

74. An extension ring for use with an oven, the oven having an upper enclosure member and a lower enclosure member which fit together to form a cooking chamber, the cooking chamber defining a height, the extension ring comprising:

a ring designed to be removably placed between the upper enclosure member and the lower enclosure member so as to increase the height of the cooking chamber; and handle means attached to the ring which can be gripped so as to selectively place the ring in between or remove the ring from between the upper enclosure member and the lower enclosure member, wherein the handle means comprises two spacers, each of the spacers having opposing side walls and a back wall.

75. The extension ring as claimed in claim 74, wherein the oven includes a rack on which food to be cooked may be placed, and wherein the ring is shaped so as to form a ledge for removably supporting the rack within in the cooking chamber.

76. The extension ring as claimed in claim 74, wherein the back wall of each spacer has an indented portion which defines a lifting surface for lifting the ring off of the lower enclosure member.

77. The expansion ring as claimed in claim 74, wherein the spacers comprise a plurality of bosses used to attach the spacers to the ring, and wherein the bosses extend past an inner edge of the side walls so as to create a space between the side walls and the ring.

78. A portable oven having a frame designed to rest on a supporting surface for cooking food, the oven comprising:

a cooking chamber having a lower enclosure member for holding the food and an upper enclosure member and housing attached thereto for covering the lower enclosure member; and a holster attached to the frame for holding the upper enclosure member and housing when they are separated from the lower enclosure member.

79. The portable oven of claim 78 wherein, the holster is supported along one side of the oven, and is located substantially on a level of the supporting surface.

80. The portable oven of claim 79, wherein the holster is configured to hold the upper enclosure member and housing so that, when being held by the holster, the upper enclosure member and housing sit on edge in the holster and lean against the side of the oven.

81. The portable oven of claim 80 wherein the holster comprises:

a substantially vertical member; and a substantially flat, substantially horizontal base attached to the substantially vertical member and to the frame of the oven for supporting the holster along the side of the oven.

82. The portable oven of claim 81 wherein the substantially vertical member comprises a back wall and two side walls attached to the back wall and to the holster base, the side walls defining a cut out portion for receiving the upper enclosure member and housing on edge.

83. The portable oven of claim 82 wherein the holster is removable.

84. The portable oven as claimed in claim 78, wherein the upper enclosure member has an outer edge, wherein the housing comprising a central portion and at least one arm extending outwardly from the central portion to beyond the outer edge of the upper enclosure member; and wherein the housing is configured so that cool air flows from a peripheral portion of the arm into the central portion of the housing, flows from the central portion of the housing back into the arm, and then is expelled from the arm over the upper surface of the upper enclosure member.

85. The portable oven as claimed in claim 84, comprising two of the arms, the arms being located on diametrically opposed sides of the central portion.

86. The portable oven as claimed in claim 85, wherein the frame comprises a base member which rests on the supporting surface and at least two upright members extending upwardly from the base member, wherein the cooking chamber is removably supported by the frame, and wherein the arms rest are supported by said upright members.

87. A holster for use with a portable oven for cooking food, the oven being designed to rest on a supporting surface and having a frame, and a cooking chamber, the cooking chamber having an upper enclosure member and a lower enclosure member, the holster comprising:

a substantially vertical member; and a substantially flat, substantially horizontal base attached to the vertical member and to the oven for holding the upper enclosure member when it is separated from the lower enclosure member.

88. The holster of claim 87 wherein the substantially vertical member further comprises a back wall and two side walls attached to the back wall and to the holster base, the side walls defining a cut out portion for receiving the upper enclosure member of the oven on edge.

89. The holster of claim 88 wherein the holster is supported along one side of the oven, and is located substantially on a level of the supporting surface.

90. The holster of claim 89 wherein the holster is configured to hold the upper enclosure member so that, when being held by the holster, the upper enclosure member sits on edge in the holster and leans against the side of the oven.

91. The holster of claim 90 wherein the holster is removable.

* * * * *

UNITED STATES PATENT AND TRADEMARK OFFICE
CERTIFICATE OF CORRECTION

PATENT NO.   :   5,466,912

DATED        :   November 14, 1995

INVENTOR(S)  :   Dornbush et al.

It is certified that error appears in the above-identified patent and that said Letters Patent is hereby corrected as shown below:

Title page, item [21], Appln. No.: "337,692" should read -- 97,492 --.

Signed and Sealed this

Twenty-third Day of April, 1996

Attest:

BRUCE LEHMAN

Attesting Officer

Commissioner of Patents and Trademarks